US008880292B2

(12) United States Patent
Shiozawa et al.

(10) Patent No.: US 8,880,292 B2
(45) Date of Patent: Nov. 4, 2014

(54) DEVICE FOR ESTIMATING VEHICLE BODY VIBRATION AND CONTROLLER FOR SUPPRESSING VEHICLE BODY VIBRATION USING SAME

(75) Inventors: Yuuki Shiozawa, Kanagawa (JP); Masaaki Nawano, Kanagawa (JP); Yosuke Kobayashi, Kanagawa (JP); Tamaki Nakamura, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 66 days.

(21) Appl. No.: 13/812,088

(22) PCT Filed: Aug. 23, 2011

(86) PCT No.: PCT/JP2011/068910
§ 371 (c)(1),
(2), (4) Date: Jan. 24, 2013

(87) PCT Pub. No.: WO2012/026441
PCT Pub. Date: Mar. 1, 2012

(65) Prior Publication Data
US 2013/0231838 A1 Sep. 5, 2013

(30) Foreign Application Priority Data

Aug. 26, 2010 (JP) .................. 2010-189027
Aug. 26, 2010 (JP) .................. 2010-189067
Aug. 26, 2010 (JP) .................. 2010-189106

(51) Int. Cl.
*B60G 17/018* (2006.01)
*B60T 8/171* (2006.01)
(Continued)

(52) U.S. Cl.
CPC ................ *B60T 8/171* (2013.01); *B60L 3/102* (2013.01); *B60W 10/04* (2013.01);
(Continued)

(58) Field of Classification Search
CPC ............... B60G 2400/102; B60G 2400/252; B60G 2400/41; B60G 2400/204; B60G 2400/106; B60G 2400/208; B60G 2400/33; B60G 2400/39; B60G 2600/182; B60G 2200/18; B60G 2202/152; B60G 2202/314; B60G 23/061
USPC ................................................ 701/37–38, 70
See application file for complete search history.

(56) References Cited

U.S. PATENT DOCUMENTS

| 7,010,409 | B2 | 3/2006 | Lu et al. |
| 2007/0139179 | A1* | 6/2007 | Yanase .................... 340/443 |
| 2010/0042293 | A1* | 2/2010 | Moshchuk et al. ........... 701/37 |
| 2010/0138108 | A1* | 6/2010 | Kajino ...................... 701/38 |

(Continued)

FOREIGN PATENT DOCUMENTS

| JP | 09-226336 A | 9/1997 |
| JP | 11-034631 A | 2/1999 |

(Continued)

Primary Examiner — Hussein A. Elchanti
(74) Attorney, Agent, or Firm — Global IP Counselors, LLP

(57) ABSTRACT

A vehicle body vibration estimating device for estimating a vehicle body vibration as a sprung mass of a vehicle where wheels are suspended via a suspension device. The vehicle body vibration estimating device includes a wheel speed physical quantity detecting section and a vibration estimating section. The wheel speed physical quantity detecting section detects a wheel speed physical quantity related to wheel speed, which is a circumferential velocity of a wheel. The vibration estimating section estimates the vehicle body vibration from a correlation relationship between displacements in a back-and-forth direction and displacements in an up-and-down direction of the wheels with respect to the vehicle body, and the wheel speed physical quantity detected by the wheel speed physical quantity detecting section.

56 Claims, 22 Drawing Sheets

(51) Int. Cl.

| | | |
|---|---|---|
| *B60L 3/10* | (2006.01) | |
| *B60W 10/04* | (2006.01) | |
| *B60W 10/184* | (2012.01) | |
| *B60W 30/02* | (2012.01) | |
| *B60W 30/20* | (2006.01) | |
| *B60W 40/11* | (2012.01) | |
| *G01M 17/007* | (2006.01) | |
| *B60T 8/17* | (2006.01) | |
| *B60T 8/1755* | (2006.01) | |
| *G06F 11/30* | (2006.01) | |
| *G01M 7/02* | (2006.01) | |

(52) U.S. Cl.
 CPC ........... *B60W 10/184* (2013.01); *B60W 30/025* (2013.01); *B60W 30/20* (2013.01); *B60W 40/11* (2013.01); *G01M 17/007* (2013.01); *B60T 8/17* (2013.01); *B60T 8/1755* (2013.01); *G06F 11/30* (2013.01); *G01M 7/02* (2013.01); *B60W 2520/16* (2013.01); *B60W 2520/263* (2013.01); *B60W 2520/28* (2013.01); *B60W 2710/0666* (2013.01); *B60W 2710/182* (2013.01); *Y02T 10/7258* (2013.01)
 USPC .................................. 701/37; 701/38; 701/70

(56) References Cited

U.S. PATENT DOCUMENTS

| | | | |
|---|---|---|---|
| 2010/0207344 A1* | 8/2010 | Nakamura | 280/124.108 |
| 2010/0276896 A1* | 11/2010 | Sano | 280/5.509 |
| 2011/0160960 A1* | 6/2011 | Kajino et al. | 701/38 |
| 2012/0116634 A1* | 5/2012 | Inoue et al. | 701/37 |

FOREIGN PATENT DOCUMENTS

| | | |
|---|---|---|
| JP | 2000-283758 A | 10/2000 |
| JP | 2004-168148 A | 6/2004 |
| JP | 2008-100605 A | 5/2008 |
| JP | 2008-179277 A | 8/2008 |
| JP | 2009-108830 A | 5/2009 |
| JP | 2009-127456 A | 6/2009 |

* cited by examiner

DEVICE FOR ESTIMATING VEHICLE BODY VIBRATION AND CONTROLLER FOR SUPPRESSING VEHICLE BODY VIBRATION USING SAME

This application is a U.S. National stage application of International Application No. PCT/JP2011/068910, filed Aug. 23, 2011, which claims priority claims priority to Japanese Patent Application Nos. 2010-189106, 2010-189027 and 2010-189067, which were filed in Japan on Aug. 26, 2010. The entire contents of these Japanese Patent Applications are hereby incorporated by reference.

BACKGROUND

Field of the Invention

The present invention relates to a vehicle body vibration estimating device, which is for estimating the vibration of the vehicle body, the sprung mass of the vehicle with the wheels suspended via a suspension device, such as the pitching vibration and the up-and-down vibration, and a controller for suppressing vehicle body vibration using the device for estimating vehicle body vibration.

The vehicle body vibration estimating device can be adopted in the vehicle body vibration damping control using a suspension device and in vehicle body vibration damping control by the driving braking force, and the types described in Japanese Unexamined Publication Nos. 2004-168148, 2009-127456 and 2008-179277 are well known.

The vehicle body vibration estimating technology described in Japanese Unexamined Publication No. 2004-168148 adopts a movement model of the vehicle body (vehicle model) to estimate the pitching movement and up-and-down movement of the vehicle body from the driving braking force on the basis of the manipulation by the driver.

In addition, the vehicle body vibration estimating technology described in Japanese Unexamined Publication Nos. 2009-127456 and 2008-179277 uses the same movement model of a vehicle body as that in the Japanese Unexamined Publication No. 2004-168148 to estimate the vehicle body vibration from the driving braking force on the basis of the manipulation by the driver. In addition, the external disturbance torque input to the vehicle body is estimated from the variation in the wheel speed, and, by also inputting the external disturbance torque into the vehicle body movement model, it is possible to make an even more accurate estimation of the vehicle body vibration by excluding the external disturbance.

SUMMARY

However, there are the following problems in the conventional vehicle body vibration estimating technology.

According to the vehicle body vibration estimating technology described in Japanese Unexamined Publication No. 2004-168148, as the vehicle body vibration is estimated using the vehicle body movement model (vehicle model) from the driving braking force based on the manipulation by the driver, if an external disturbance is input due to an uneven road surface, it might be impossible to make a correct estimation of the vehicle body vibration.

In addition, according to the vehicle body vibration estimating technology described in Japanese Unexamined Publication Nos. 2009-127456 and 2008-179277, when the vehicle body vibration is estimated from the driving braking force using the vehicle body movement model, the magnitude of the external disturbance torque is predicted from the vehicle wheel speed variation, and it is possible to estimate the vehicle body vibration even more accurately while excluding the vehicle body vibration with the external disturbance torque by the input of this external disturbance torque to the vehicle body movement model.

However, each wheel speed variation may not be represented as the magnitude of the external disturbance torque applied to the wheel. As a result, the magnitude of the external disturbance torque predicted from the variation in the wheel speed is also incorrect, degrading the precision in estimating the vehicle body vibration based on it, which is undesirable.

For example, according to the vehicle body vibration estimating technology described in Japanese Unexamined Publication No. 2008-179277, the torque applied to the wheel is computed from the product of the wheel load and the wheel rotating angular velocity. However, the wheel load is different from the wheel mass, so that the result of computing of the torque applied to the wheel may not be correct.

As a result, it is impossible to realize the intrinsic objective in estimating the vehicle body vibration correctly while excluding the influence of the external disturbance.

The present invention was conceived based on the viewpoint that the aforementioned problems of the latter two documents related to the prior art are caused by the fact that the vehicle body vibration is estimated from such parameters as a spring constant and the vehicle mass which vary according to degradation over time and increasing/decreasing of the number of persons in the vehicle, i.e., from the driving/braking force, the external disturbance torque, and other torques and forces. Therefore, the present invention provides a scheme for estimating the vehicle body vibration from wheel speed information without using the aforementioned torques and forces based on reasoning that will now be explained.

That is, under the geometric constraints of the suspension device (suspension link structure) (suspension geometry), the vehicle body vibration leads to back-and-forth movement of the wheel, and such back-and-forth movement of the wheel becomes variation in the wheel speed.

On the other hand, when the wheel shifts back-and-forth, it also shifts up-and-down according to a prescribed relationship depending on the suspension geometry (suspension link structure), that is the correlation relationship between the displacements in the back-and-forth direction and the displacements in the up-and-down direction of the wheels with respect to the vehicle body.

That is, the purpose of the present invention is to solve the problems of the prior art by providing a vehicle body vibration estimating device and a vehicle body vibration suppressing controller using the vehicle body vibration estimating device on the basis of the reasoning, which leads to recognition that the vehicle body vibration can be estimated from the correlation relationship and the wheel speed information, and thus a specific manifestation of the idea in estimating the vehicle body vibration without using the torques and forces.

In order to realize the objective, the vehicle body vibration estimating device of the present invention has the following configuration.

First of all, the vehicle body vibration estimating device with the present invention as the precondition will be explained.

It is for estimating the vibration of the vehicle body as the sprung mass of the vehicle with its wheels suspended via a suspension device.

The present invention is characterized in that the following means are arranged in the vehicle body vibration estimating device:

a wheel speed physical quantity detecting means for detecting the physical quantity related to the wheel speed, that is, the circumferential velocity of the wheel, and a vibration estimating means for estimating the vibration of the vehicle body from the correlation relationship between the displacements in the back-and-forth direction and the displacements in the up-and-down direction of the wheels with respect to the vehicle body.

The vehicle body vibration suppressing controller of the present invention is characterized by the following facts: it has the vehicle body vibration estimating device, and it has the following means arranged therein: a driving braking force correction quantity computing means for computing the driving braking force correction quantity needed for alleviating the vehicle body vibration estimated by the vibration estimating means, and a driving braking force correcting means that corrects the driving braking force of the vehicle for a quantity corresponding to only the driving braking force correction quantity determined using the means.

According to the vehicle body vibration estimating device of the present invention, the vehicle body vibration is estimated from the wheel speed physical quantity on the basis of the correlation relationship between the displacements in the back-and-forth direction and the displacements in the up-and-down direction of the wheels with respect to the vehicle body.

Consequently, it is possible to estimate the vehicle body vibration from the wheel speed physical quantity without using the torques and forces, such as the spring constant, vehicle mass, etc., that vary corresponding to degradation over time and the increase/decrease in the number of the occupants riding in the vehicle; it is also possible to increase the precision in estimating the vehicle body vibration while free of the influence of external disturbance.

The vehicle body vibration suppressing controller of the present invention has the vehicle body vibration estimating device, which is utilized in computing the driving braking force correction quantity needed for decreasing the vehicle body vibration estimated by the vehicle body vibration estimating device to correct the driving braking force of the vehicle corresponding to the driving braking force correction quantity.

Consequently, the estimated vehicle body vibration has a high precision with an excellent external disturbance robust property, so that the vehicle body vibration can always be alleviated.

DETAILED DESCRIPTION OF THE EMBODIMENTS

Figure 1:
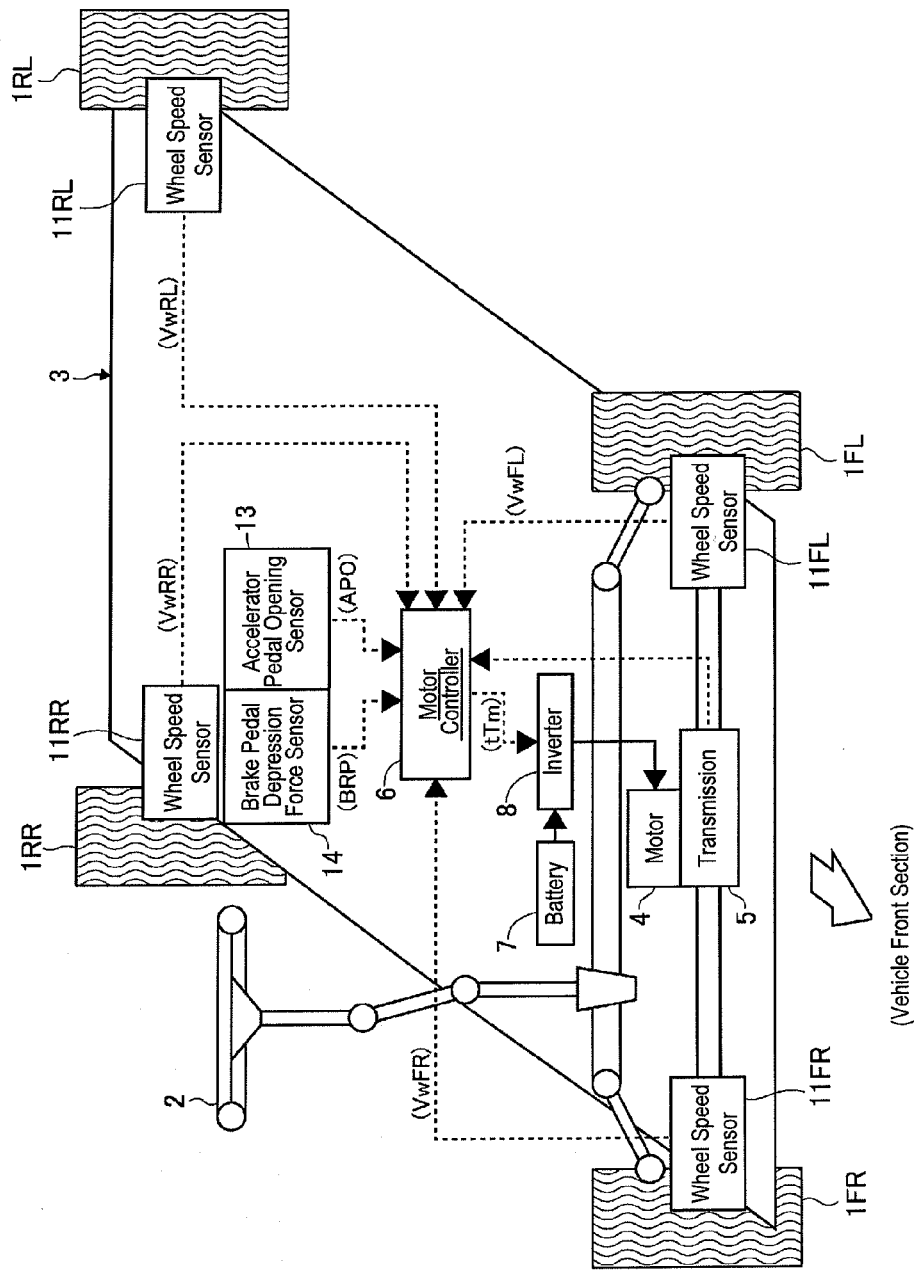
FIG. 1 is a schematic system diagram illustrating the vehicle body vibration suppressing control system having the vehicle body vibration estimating device and the vehicle body vibration suppressing controller in the first embodiment of the present invention.

Embodiments of the present invention are described in detail below with reference to the embodiments in the drawings.

First Embodiment

<Configuration>

FIG. 1 is a schematic system diagram illustrating the vehicle body vibration suppressing control system having the vehicle body vibration estimating device and the vehicle body vibration suppressing controller in the first embodiment of the present invention.

In FIG. 1, 1FL and 1FR represent the left/right front wheels, respectively, and 1RL and 1RR represent the left/right rear wheels, respectively.

The left/right front wheels 1FL and 1FR are the wheels for steering steered by steering wheel 2.

The left/right front wheels 1FL and 1FR and the left/right rear wheels 1RL and 1RR are suspended on the vehicle body 3 by a suspension device not shown in the drawing. This vehicle body 3 is positioned above the suspension device to form the sprung mass.

The vehicle shown in FIG. 1 is a front wheel driving-type electric automobile that can run as the left/right front wheels 1FL and 1FR are driven by the motor 4 as a rotating electric motor, via a transmission unit 5 containing a differential gear unit.

When the motor 4 is controlled, the motor controller 6 conducts DC-AC conversion for the electric power of the battery (electric charge storing unit) 7 by an inverter 8, and it supplies the obtained AC electric power to the motor 4 under the control of the inverter 8. As a result, the motor 4 is controlled so that the torque of the motor 4 is in agreement with the motor torque instruction value tTm.

When the motor torque instruction value tTm has negative polarity that requests the regeneration brake function of the motor 4, the motor controller 6 sends the power generation load to the motor 4 via the inverter 8 so that the battery 7 is not overcharged.

In this case, the electric power generated by the regeneration brake function of the motor 4 is subject to AC-DC conversion by the inverter 8, and the obtained DC power is charged in the battery 7.

The motor controller 6 carries out the vehicle body vibration estimating computing operation to be explained in detail later, and, at the same time, it carries out the vehicle body vibration suppressing computing operation to determine the motor torque instruction value tTm so as to suppress the vehicle body vibration according to the result of the estimation of the vehicle body vibration estimating computing operation.

The following signals are input to the motor controller 6 for carrying out the computing operations:

the signals from the wheel speed sensors 11FL and 11FR that individually detect the front wheel speeds VwFL and VwFR, the circumferential velocities of the left/right front wheels 1FL and 1FR, and the signals from the wheel speed sensors 11RL and 11RR that individually detect the rear wheel speeds VwRL and VwRR, the circumferential velocities of the left/right rear wheels 1RL and 1RR, the signal from the accelerator pedal opening sensor 13 that detects the accelerator pedal openness APO (accelerator pedal step-down quantity), the signal from the brake pedal depression force sensor 14 that detects the brake pedal stepping force BRP, and the gear ratio information from the transmission unit 5.

In addition, according to the present embodiment, the front wheel speeds VwFL and VwFR are adopted as the physical quantities that represent the circumferential velocities of the left/right front wheels 1FL and 1FR, respectively, and the rear wheel speeds VwRL and VwRR are adopted as the physical quantities that represent the circumferential velocities of the left/right rear wheels 1RL and 1RR, respectively.

However, the present invention is not limited to the scheme. One may also adopt a scheme of obtaining the circumferential velocity of the corresponding wheel from the rotation velocity at any site that rotates together with the left/right front wheels 1FL and 1FR and the left/right rear wheels 1RL and 1RR.

Consequently, the wheel speed corresponds to the wheel speed physical quantity according to the present invention, and the front wheel speed and the rear wheel speed correspond to the front wheel physical quantity and the rear wheel physical quantity according to the present invention, respectively.

The wheel speed sensors 11FL and 11FR, 11RL and 11RR form the wheel speed physical quantity detecting means according to the present invention.

On the basis of the input information, the motor controller 6 estimates the vibration of the vehicle body 3, and, at the same time, it determines the motor torque instruction value tTm by correcting the torque requested by the driver (attached with key of rTd, to be explained later) so that the estimated vibration of the vehicle body 3 is suppressed.

Figure 2:
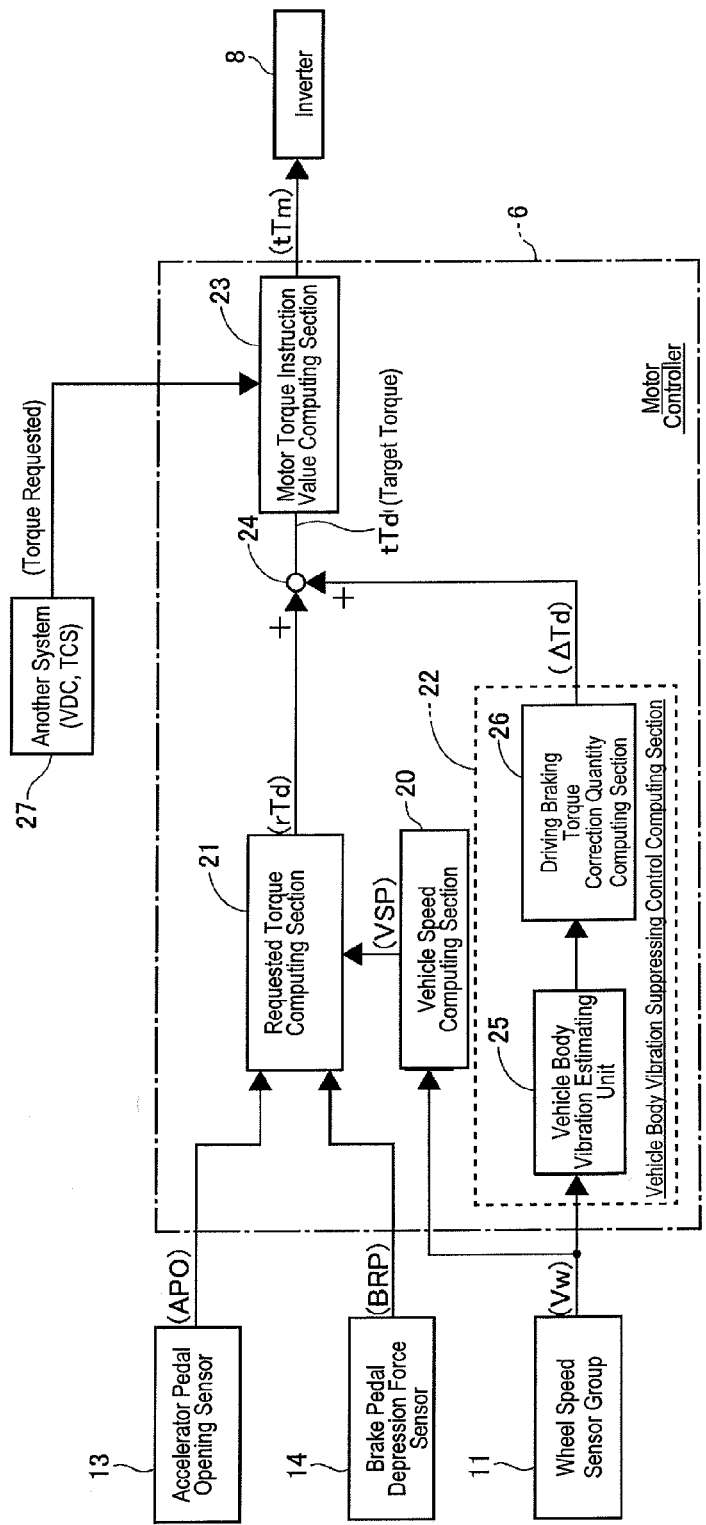
FIG. 2 is a block diagram illustrating the functions of the motor controller shown in FIG. 1.

As shown in FIG. 2, a block diagram illustrating the overall configuration, the motor controller 6 comprises a vehicle speed computing section 20, a requested torque computing section 21, a vehicle body vibration suppressing control computing section 22, a motor torque instruction value computing section 23, and an adder 24.

The vehicle speed computing section 20 determines the vehicle speed VSP on the basis of front wheel speeds VwFL and VwFR and rear wheel speeds VwRL and VwRR (indicated as wheel speed Vw in FIG. 2) detected by the wheel speed sensors 11FL and 11FR, 11RL and 11RR (indicated by wheel speed sensor group 11 in FIG. 2).

From the vehicle speed VSP detected by the vehicle speed computing section 20, the accelerator pedal openness APO and the brake pedal stepping force BRP detected by the sensors 13, 14, respectively, the requested torque computing section 21 carries out a computing operation by map retrieval or the like to determine the requested torque rTd (a driving torque if it is a positive value, and a brake torque it is a negative value) requested by the driver who performs driving (accelerator pedal openness APO or brake pedal stepping force BRP) on the basis of the current vehicle speed VSP.

The vehicle body vibration suppressing control computing section 22 comprises a vehicle body vibration estimating unit 25 and a driving braking torque correction quantity computing unit 26.

The vehicle body vibration estimating unit 25 estimates the vibration of the vehicle body 3 from the wheel speed Vw to be explained in detail later.

The driving braking torque correction quantity computing unit 26 computes the driving braking torque correction quantity ΔTd needed for suppressing the estimated vehicle body vibration.

Consequently, the vehicle body vibration estimating unit 25 is made of a vibration estimating means according to the present invention.

The adder 24 adds the driving braking torque correction quantity ΔTd for suppressing the vehicle body vibration determined by the driving braking torque correction quantity computing unit 26 to the requested torque rTd determined by the requested torque computing section 21 to determine the target torque tTd that meets the request by the driver while suppressing the vehicle body vibration.

The motor torque instruction value computing section 23 receives the torque request from another system 27, such as a behavior controller (VDC) for controlling the vehicle behavior and a traction controller (TCS) for preventing driving slip of the driving wheels (front wheels) 1FL and 1FR; it limits or adjusts the target torque tTd to determine the final motor torque instruction value tTm to meet the demands.

The motor controller 6 supplies the electric power to the motor 4 from the battery 7 under control of the inverter 8 corresponding to the motor torque instruction value tTm determined as mentioned previously, so that it controls driving of the motor 4 to ensure that the torque of the motor 4 is in agreement with the motor torque instruction value tTm.

<Estimation of the Vehicle Body Vibration and Vehicle Body Vibration Suppressing Control>

Figure 3:
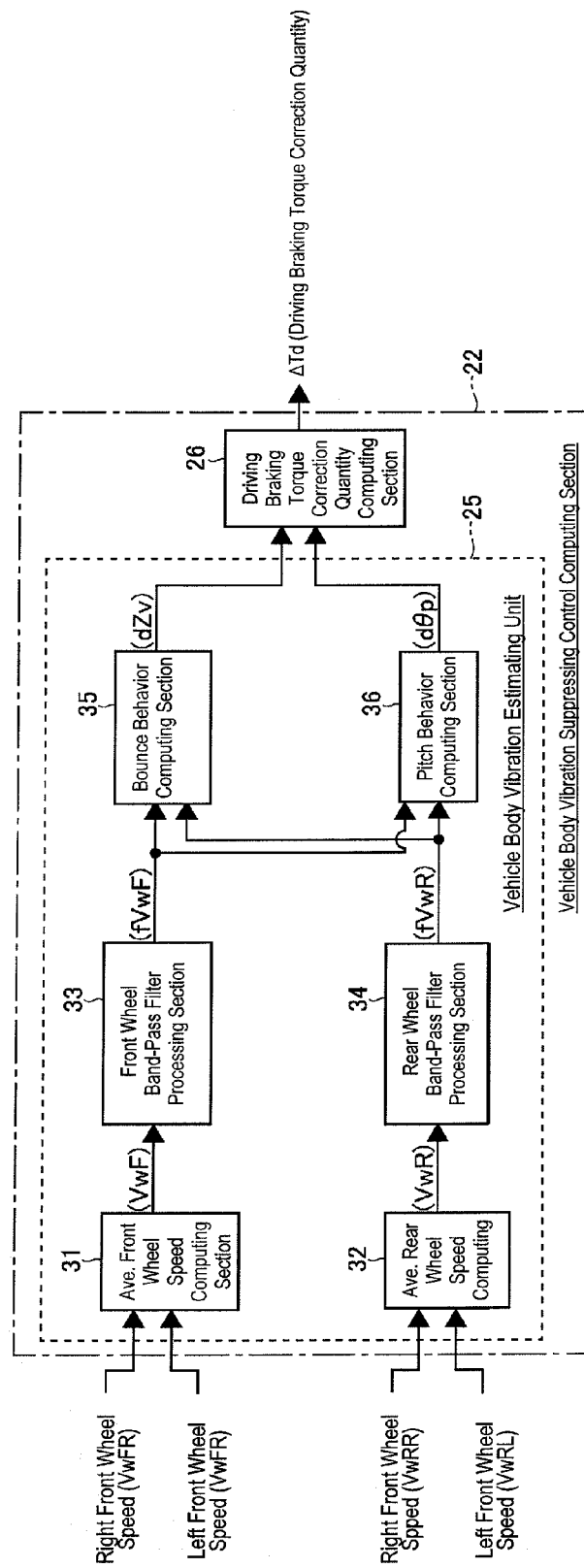
FIG. 3 is a block diagram illustrating the functions of the vehicle body vibration suppressing control computing section shown in FIG. 2.
Figure 4:
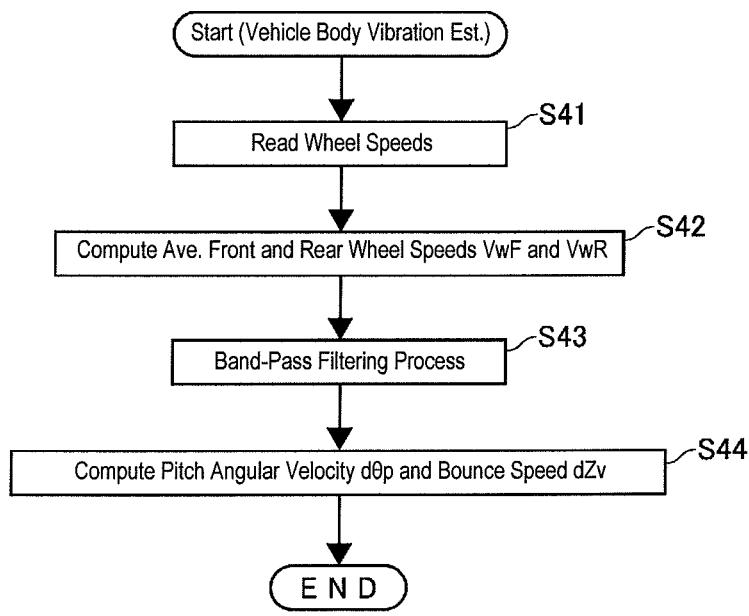
FIG. 4 is a flow chart illustrating the control program for estimating the vibration of the vehicle body executed by the vehicle body vibration estimating device shown in FIGS. 2 and 3.

The vehicle body vibration estimating unit 25 inside the vehicle body vibration suppressing control computing section 22 has the configuration as shown in FIG. 3, a block diagram, to execute the control program shown in FIG. 4 to estimate the vibration of the vehicle body 3 (in this embodiment, the pitch angular velocity dθp and the bounce speed dZv as the up-and-down displacement velocity).

First of all, in step S41 shown in FIG. 4, the vehicle body vibration estimating unit 25 reads the left/right front wheel speeds VwFL and VwFR and the left/right rear wheel speeds VwRL and VwRR as shown in FIG. 3.

Then, in the average front wheel speed computing section 31 and the average rear wheel speed computing section 32 (step S42 shown in FIG. 4) shown in FIG. 3, from the left/right front wheel speeds VwFL and VwFR, the average front wheel speed VwF=(VwFL+VwFR)/2 is computed, and, at the same time, from the left/right rear wheel speeds VwRL and VwRR, the average rear wheel speed VwR=(VwRL+VwRR)/2 is computed.

Then, in the band-pass filter processing section 33 for the front wheels and the band-pass filter processing section 34 for the rear wheels shown in FIG. 3 (step S43 shown in FIG. 4), the following operation is carried out: in the band-pass filters for extracting only the component near the vehicle body resonance frequency from the average front wheel speed VwF and the average rear wheel speed VwR, the average front wheel speed VwF and the average rear wheel speed VwR pass through them, respectively, and the vibration component fVwF near the vehicle body resonance frequency of the average front wheel speed VwF and the vibration component fVwR near the vehicle body resonance frequency of the average rear wheel speed VwR are obtained.

The reason for the operation in which filtering process is carried out for the average front wheel speed VwF and average rear wheel speed VwR to extract only the vibration components fVwF and fVwR near the vehicle body resonance frequency is for removing the variation in the wheel speed and the noise component caused by acceleration/deceleration of the overall vehicle from the average front wheel speed VwF and the average rear wheel speed VwR, so that only the vehicle speed component that represents the vehicle body vibration is extracted.

Next, with the bounce behavior computing section 35 of FIG. 3 and the pitching behavior computing section 36 (step S44 in FIG. 4), the vibration of the vehicle body 3 (bounce speed dZv as the up-and-down displacement speed, and pitch angular velocity dθp) is determined from the vibration component fVwF near the vehicle body resonance frequency of the average front wheel speed VwF and the vibration component fVwR near the vehicle body resonance frequency of the average rear wheel speed VwR.

In the following, the method of determining the bounce speed dZv and the pitch angular velocity dθp of the vehicle body 3 from the vibration components fVwF and fVwR of the wheel speed will be explained.

Figure 5:
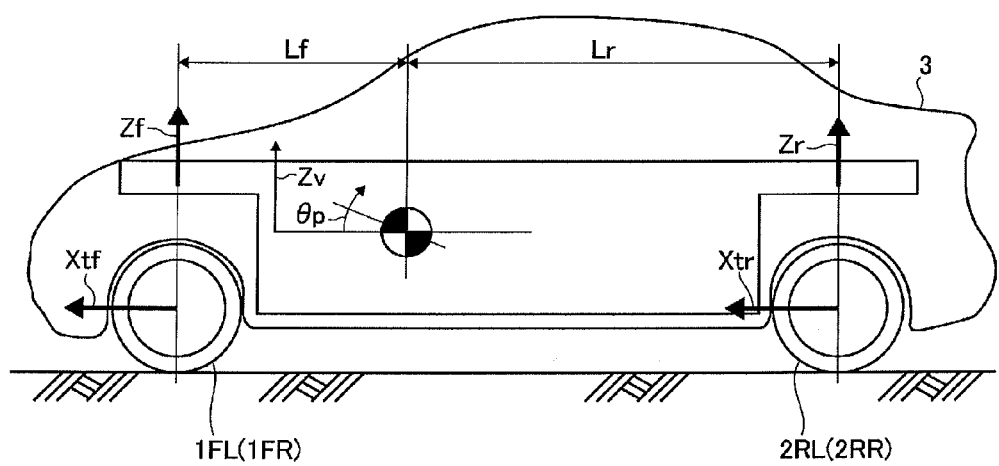
FIG. 5 is a diagram illustrating various parameters of the vehicle. It shows the parameters of the vehicle, that is, the relationship between the up-and-down bouncing movement Zv and the pitching movement θ p at the center of gravity of the vehicle body and the up-and-down displacements Zf at the site above the front axle of the vehicle body and the up-and-down displacements Zr at the site above the rear axle of the vehicle body.

FIG. 5 is a schematic diagram illustrating the relationship between the bounce movement Zv and the pitching movement θp as the up-and-down movement at the center of gravity of the vehicle body 3, and between the up-and-down displacements Zf at the site above the front axle of the vehicle body 3 and the up-and-down displacements Zr at the site above the rear axle of the vehicle body 3, in the vehicle in which Lf denotes the distance between the center of gravity and the front axle and Lr denotes the distance between the center of gravity and the rear axle.

As can be seen from this figure, when the up-and-down displacement Zv and pitching angle θp take place at the vehicle body 3, the up-and-down displacements Zf and Zr also take place at the site above the front axle of the vehicle body 3 and the site above the rear axle of the vehicle body. There is the following relationship among Zv, θp, Zf and Zr.

$$Zf = Zv + \theta p \cdot Lf \quad (1)$$

$$Zr = Zv - \theta p \cdot Lr \quad (2)$$

Now, studies have been conducted on the movable regions in the up-and-down direction and back-and-forth direction of the left/right front wheels 1FL and 1FR and left/right rear wheels 1RL and 1RR with respect to the vehicle body 3. These movable regions depend on the geometric constraints corresponding to the respective suspension geometry.

Figure 6:
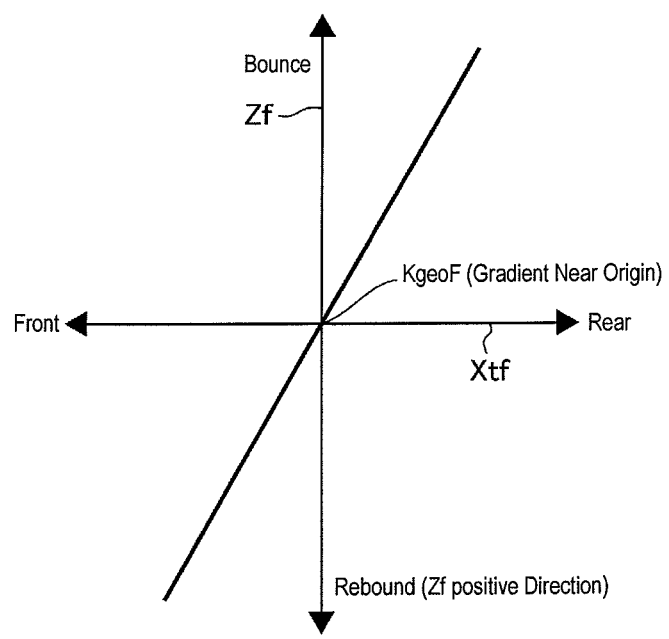
FIG. 6 is a characteristics line drawing illustrating the relationship between the displacements in the back-and-forth direction and the displacements in the up-and-down direction related to the front wheels of the vehicle shown in FIG. 5.

Consequently, when the vehicle body 3 and the left/right front wheels 1FL and 1FR make relative movement in the up-and-down direction indicated by Zf, the vehicle body 3 and the left/right front wheels 1FL and 1FR make relative displacements also in the back-and-forth direction indicated by Xtf, with the relationship shown in, for example, FIG. 6.

Figure 7:
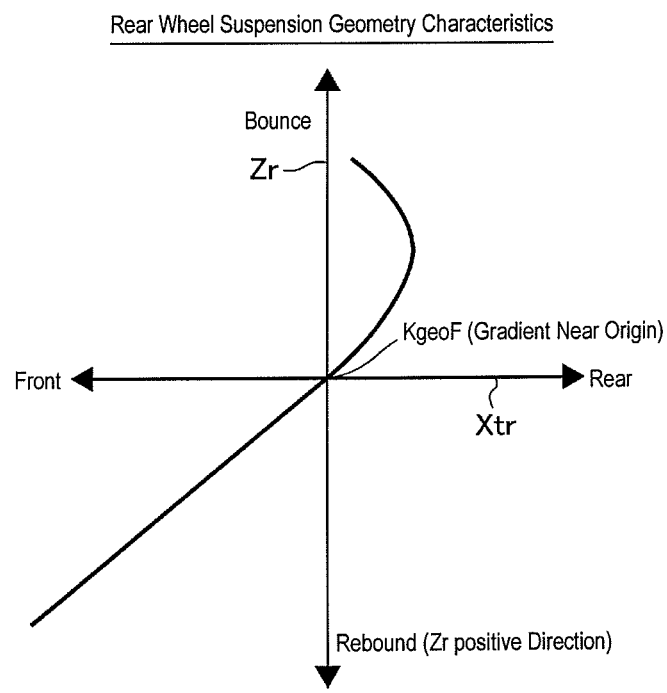
FIG. 7 is a characteristics line drawing illustrating the rear wheel suspension geometry characteristics showing the relationship between the displacements in the back-and-forth direction and the displacements in the up-and-down direction related to the rear wheels of the vehicle shown in FIG. 5.

In addition, when the vehicle body 3 and the left/right rear wheels 1RL and 1RR make relative movement in the up-and-down direction indicated by Zr, the vehicle body 3 and the left/right rear wheels 1RL and 1RR also make relative displacements in the back-and-forth direction indicated by Xtr, with the relationship shown in, for example, FIG. 7.

That is, as explained above, when the displacements in the back-and-forth direction Xtf of the left/right front wheels 1FL and 1FR representing the vehicle body vibration and the displacements in the back-and-forth direction Xtr of the left/right rear wheels 1RL and 1RR representing the vehicle body vibration are obtained and monitored from the vibration component fVwF near the vehicle body resonance frequency of the front wheel speed and the vibration component fVwR near the vehicle body resonance frequency of the rear wheel speed obtained by extracting only the wheel speed component representing the vehicle body vibration, it is possible to predict the up-and-down displacements Zf and Zr at the site above the front axle and the site above the rear axle of the vehicle body 3, respectively, from the relationship shown in FIGS. 6 and 7.

The bounce behavior computing section 35 and the pitching behavior computing section 36 (step S44 in FIG. 4) in FIG. 3 that carry out prediction of the up-and-down displacements Zf and Zr correspond to the front wheel up-and-down movement estimating section and the rear wheel up-and-down movement estimating section of the present invention, respectively.

The front wheel suspension geometry characteristics shown in FIG. 6 and the rear wheel suspension geometry characteristics shown in FIG. 7 are converted to maps as is, and are stored and pre-converted to a model. These data are adopted in predicting the up-and-down displacements Zf and Zr at the site above the front axle and the site above the rear axle of the vehicle body 3 from the displacements in the back-and-forth direction Xtf of the front wheels and the displacements in the back-and-forth direction Xtr of the rear wheels, respectively. As a result, prediction of the up-and-down displacements Zf and Zr can be made accurately.

However, in consideration of the cost, in the present embodiment, the following simpler scheme is adopted. The gradient KgeoF (in the case shown in FIG. 6) and the gradient KgeoR (in the case shown in FIG. 7) near the balance point (the origin as shown in FIGS. 6 and 7) when the vehicle is not in motion on flat ground then with an acceleration of 1 G acting on it, are subject to linear approximation, and these KgofF and KgeoR are then adopted as proportional coefficients.

When these proportional coefficients KgeoF, KgeoR are adopted, the following relationships exist between the displacements in the back-and-forth direction Xtf and the up-and-down displacements Zf for the front wheels and between the displacements in the back-and-forth direction Xtr and the up-and-down displacements Zr for the rear wheels.

$$Zf = KgeoF \cdot Xtf \quad (3)$$

$$Zr = KgeoR \cdot Xtr \quad (4)$$

By simultaneously solving the equations of the 4 equations, it is possible to obtain the following equations that can be adopted in determining the bounce movement Zv and the pitching movement θp of the vehicle body 3 on the basis of the vehicle body vibration (up-and-down bounce speed dZv, pitch angular velocity dθp) from the displacements in the back-and-forth direction Xtf of the front wheels and the displacements in the back-and-forth direction Xtr of the rear wheels.

$$\theta p = (KgeoF \cdot Xtf - KgeoR \cdot Xtr)/(Lf + Lr) \quad (5)$$

$$Zv = (KgeoF \cdot Xtf \cdot Lf + KgeoR \cdot Xtr \cdot Lr)/(Lf + Lr) \quad (6)$$

Both sides of the above-listed equations are then integrated, and the following equations can be adopted in determining the vibration of the vehicle body 3 (up-and-down bounce speed dZv and pitch angular velocity dθp).

Here, "d" refers to the differential operator that can be adopted easily.

$$d\theta p = (KgeoF \cdot dXtf - KgeoR \cdot dXtr)/(Lf + Lr) \quad (7)$$

$$dZv = (KgeoF \cdot dXtf \cdot Lf + KgeoR \cdot dXtr \cdot Lr)/(Lf + Lr) \quad (8)$$

With these equations, the up-and-down bounce speed dZv and the pitch angular velocity dθp of the vehicle body 3 can be determined.

Using the band-pass filter processing sections 33 and 34 shown in FIG. 3 (step S43 in FIG. 4), only the wheel speed component representing the vehicle body vibration is extracted as explained above and, from the vibration component fVwF near the vehicle body resonance frequency of the front wheel speed and the vibration component fVwR near the vehicle body resonance frequency of the rear wheel speed, the displacements Xtf in the back-and-forth direction of the left/right front wheels 1FL and 1FR and the displacements in the back-and-forth direction Xtr of the left/right rear wheels 1RL and 1RR are determined, respectively.

The time differential values dXtf and dXtr of the displacements in the back-and-forth direction Xtf and Xtr are substituted into the equations (7) and (8), and it is possible to compute and estimate the vibration of the vehicle body 3 (up-and-down bounce speed dZv and pitch angular velocity dθp), respectively.

On the basis of the vehicle body vibration (up-and-down bounce speed dZv and pitch angular velocity dθp) estimated above, the correction quantity computing section 26 shown in FIG. 3 computes and outputs the driving braking torque correction quantity ΔTd needed for suppressing the vehicle body vibration (up-and-down bounce speed dZv and pitch angular velocity dθp), then the results are sent to the adder 24 shown in FIG. 2.

The adder 24 shown in FIG. 2 corrects the requested torque rTd requested by the driver as explained above by a quantity corresponding to the driving braking torque correction quantity ΔTd for suppressing the vehicle body vibration as explained above, determined by the computing section 21, and, while suppressing the vehicle body vibration, it determines the target torque tTd that can meet the demand of the driver.

The motor torque instruction value computing section 23 of FIG. 2 limits or adjusts the target torque tTd to meet the request for torque from another system 27, and determines the final motor torque instruction value tTm for realizing this purpose, and the result is adopted in control of driving of the motor 4 via the inverter 8.

<Effects>

As explained above, for the motor 4, driving control is carried out to suppress the vehicle body vibration (up-and-down bounce speed dZv and pitch angular velocity dθp) while meeting the requested torque rTd requested by the driver. Due to suppression of the vehicle body vibration (up-and-down bounce speed dZv and pitch angular velocity dθp), of course, comfort of riding in the vehicle can be improved; it is also possible improve the steering stability since it is possible to have a stable vehicle body posture when the vehicle turns.

In addition, according to this embodiment, on the basis of the prescribed correlation relationship (suspension geometry characteristics) shown in FIGS. 6 and 7 between the displacements in the back-and-forth direction Xtf and Xtr and the up-and-down displacements Zf and Zr of the left/right front wheels 1FL and 1FR and the left/right rear wheels 1RL and 1RR with respect to the vehicle body 3, the vehicle body vibration (up-and-down bounce speed dZv and pitch angular velocity dθp) is estimated from the vibration component fVwF near the vehicle body resonance frequency of the average front wheel speed VwF and the vibration component fVwR near the vehicle body resonance frequency of the average rear wheel speed VwR.

Consequently, it is possible to determine the vehicle body vibration without adding the suspension stroke sensor or other new parts, and this is preferred since it can reduce the cost.

In addition, without using the torques and forces that vary corresponding to variations in the spring constant, vehicle mass, and other factors depending on degradation over time and changes in the number of the occupants riding in the vehicle, the vehicle body vibration is estimated from the information related to the wheel speed, that is, from the vibration component fVwF near the vehicle body resonance frequency of the average front wheel speed VwF and the vibration component fVwR near the vehicle body resonance frequency of the average rear wheel speed VwR. Consequently, it is possible to increase the precision of estimation of the vehicle body vibration (up-and-down bounce speed dZv and pitch angular velocity dθp); at the same time, it is possible not to be interfered by the influence of external disturbances.

The front wheel suspension geometry characteristics shown in FIG. 6 and the rear wheel suspension geometry characteristics shown in FIG. 7 are converted to maps as is, and are stored and pre-converted to model. These data of maps and models are adopted in predicting the up-and-down displacements Zf and Zr at the site above the front axle and the site above the rear axle of the vehicle body 3 from the displacements in the back-and-forth direction Xtf of the front wheels and the displacements in the back-and-forth direction Xtr of the rear wheels, respectively. As a result, prediction of the up-and-down displacements Zf and Zr can be made accurately. However, this scheme is unfavorable in consideration of the cost.

According to the present embodiment, from the viewpoint that there is no need to cover the entire region of the suspension stroke in consideration of the usual running state, an easy scheme is adopted as follows. That is, suppose the vehicle is not moving on the flat ground, then an acceleration of 1 G is applied. In this state, the gradient KgeoF (in the case shown in FIG. 6) and the gradient KgeoR (in the case shown in FIG. 7) near the balance point (the origin as shown in FIGS. 6 and 7) are subject to linear approximation, and these KgofF and KgeoR are then adopted as the proportional coefficients. From these proportional coefficients and the displacements Xtf in the back-and-forth direction of the left/right front wheels and the displacements in the back-and-forth direction Xtr of the left/right rear wheels, it is possible to predict the up-and-down displacements Zf and up-and-down displacements Zr at the site above the front axle and the site above the rear axle of the vehicle body 3, respectively. As a result, the scheme is highly preferable in consideration of the cost.

In addition, according to this embodiment, the suspension geometry characteristics of the front wheels shown in FIG. 6 and the suspension geometry characteristics of the rear wheels shown in FIG. 7 are individually adopted to predict the up-and-down displacements Zf and up-and-down displacements Zr at the site above the front axle and the site above the rear axle of the vehicle body 3, respectively, from the back-and-forth displacement Xtf of the front wheel and the back-and-forth displacement Xtr of the rear wheel. Consequently, prediction of the up-and-down displacements Zf and Zr is accurate, and estimation of the vehicle body vibration (up-and-down bounce speed dZv and pitch angular velocity dθp) can be carried out at a high precision.

In addition, according to this embodiment, when the vehicle body vibration is estimated, the vibration component fVwF near the vehicle body resonance frequency of the average front wheel speed VwF and the vibration component fVwR near the vehicle body resonance frequency of the average rear wheel speed VwR are adopted.

Consequently, the vehicle body vibration is estimated using only the wheel speed information along with the vehicle body vibration without considering the variation in the wheel speed caused by acceleration/deceleration of the overall vehicle and the noise components, so that the estimation can be carried out at a high precision.

Second Embodiment

<Configuration>

Figure 8:
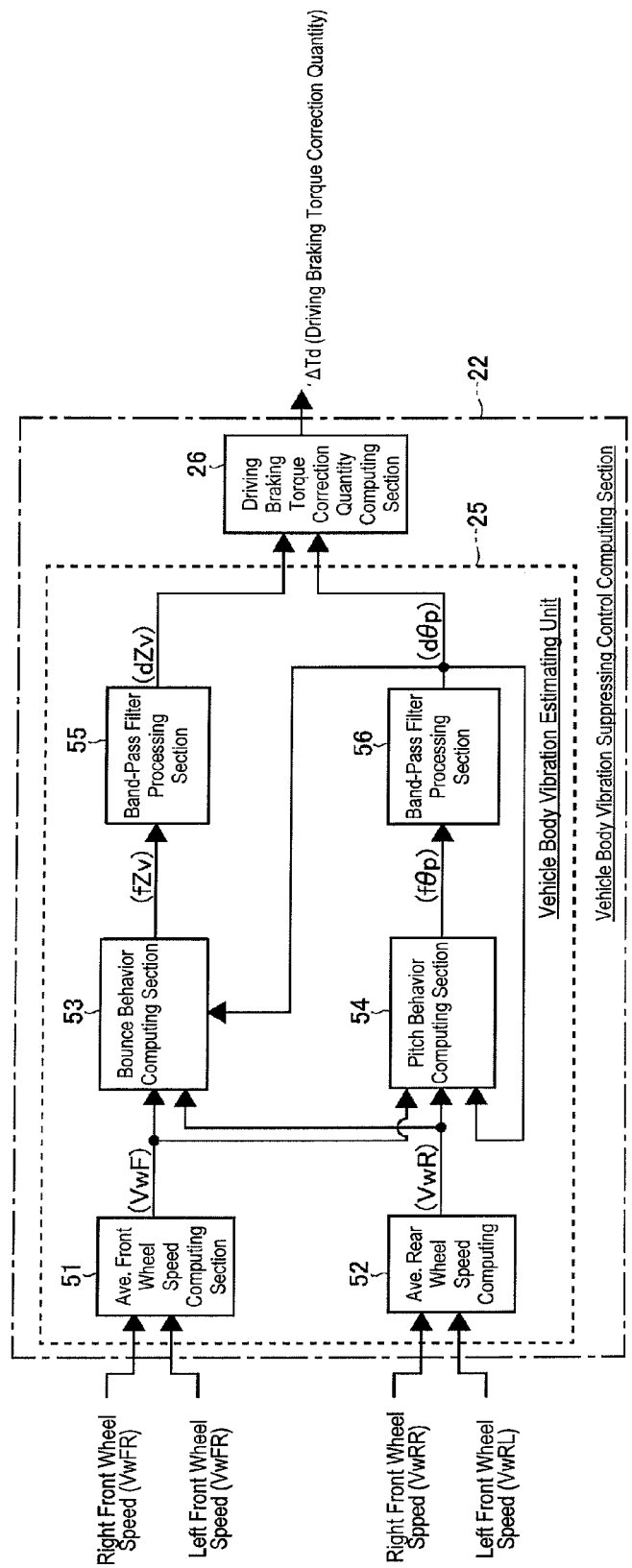
FIG. 8 is a block diagram illustrating the functions of the vehicle body vibration suppressing control computing section corresponding to FIG. 3. It shows the vehicle body vibration estimating device in the second embodiment of the present invention.
Figure 9:
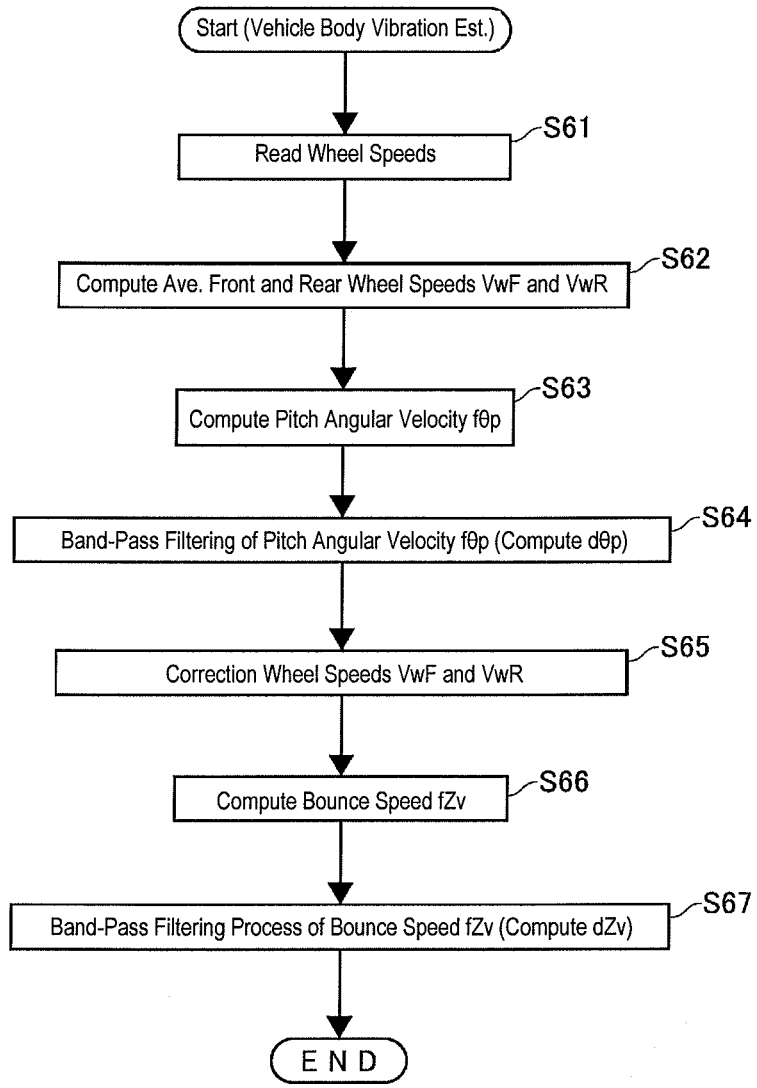
FIG. 9 is a flow chart illustrating the control program for estimating the vibration of the vehicle body executed by the vehicle body vibration estimating unit shown in FIG. 8.

FIGS. 8 and 9 are diagrams illustrating the vehicle body vibration estimating device related to the second embodiment of the present invention. FIG. 8 is a block diagram corresponding to FIG. 3 and FIG. 9 shows the vehicle body vibration estimating program corresponding to FIG. 4.

According to this embodiment, the vehicle body vibration suppressing control system is the same as that shown in FIG. 1, and the motor controller 6 is the same as that shown in FIG. 2. Consequently, the vehicle body vibration suppressing control system and the motor controller 6 will not be explained again with reference to these drawings. In the following, only the features different from the first embodiment will be explained with reference to FIGS. 8 and 9.

<Estimation of the Vehicle Body Vibration and the Vehicle Body Vibration Suppressing Control>

According to the present embodiment, the vehicle body vibration estimating unit 25 in the vehicle body vibration suppressing control computing section 22 has the configuration shown by the block diagram in FIG. 8. The vehicle body vibration estimating unit 25 executes the control program shown in FIG. 9 to estimate the vibration of the vehicle body 3 (just as in the first embodiment, in this embodiment as well, this refers to the pitch angular velocity dθp and the up-and-down bounce speed dZv).

First of all, in step S61 shown in FIG. 9, the vehicle body vibration estimating unit 25 reads the left/right front wheel speeds VwFL and VwFR and left/right rear wheel speeds VwRL and VwRR as shown in FIG. 8.

Next, by the average front wheel speed computing section 51 and the average rear wheel speed computing section 52 (step S62 shown in FIG. 9), the average front wheel speed VwF=(VwFL+VwFR)/2 is computed from the left/right front wheel speeds VwFL and VwFR, and the average rear wheel speed VwR=(VwRL+VwRR)/2 is computed from the left/right rear wheel speeds VwRL and VwRR.

Next, as shown in FIG. 8, by the bounce behavior computing section 53, the pitching behavior computing section 54, and the band-pass filter processing sections 55 and 56 (step S63 to step S67 in FIG. 9), the vibration of the vehicle body 3 (up-and-down bounce speed dZv and pitch angular velocity dθp as the up-and-down displacement speeds) is determined from the average front wheel speed VwF and the average rear wheel speed VwR that will be explained below.

First of all, by the pitching behavior computing section 54 shown in FIG. 8 (step S63 in FIG. 9), the displacements Xtf in the back-and-forth direction of the left/right front wheels 1FL and 1FR and the displacements in the back-and-forth direction Xtr of the left/right rear wheels 1RL and 1RR are determined from the average front wheel speed VwF and average rear wheel speed VwR; these displacements in the back-and-forth direction Xtf and Xtr of the front wheels and rear wheels are adopted to perform computing using the equation (5) to determine the pitching movement θp of the vehicle body 3, which is then time differentiated to get the pitch angular velocity fθp of the vehicle body 3.

Next, in the band-pass filter processing section 56 shown in FIG. 8 (step S64 as shown in FIG. 9), the pitch angular velocity fθp is fed through the band-pass filter for extracting only the component of the pitch angular velocity fθp of the vehicle body 3 near the resonance frequency of the vehicle body to determine the final pitch angular velocity dθp as the vibration component of the pitch angular velocity fθp near the resonance frequency of the vehicle body.

The reason for the operation in which the filtering process is carried out for the pitch angular velocity fθp of the vehicle body 3 to extract only the component near the resonance frequency of the vehicle body is as follows. That is, the pitch angular velocity fθp contains the variation in the wheel speed caused by acceleration/deceleration of the entirety of the vehicle and the noise components, and these components should be removed from the pitch angular velocity fθp to obtain the final pitch angular velocity dθp that represents only the vehicle body vibration.

However, when a pitch angular velocity is generated on the vehicle body 3, even when there is no variation in the actual wheel speeds VwF and VwR, there is a relative difference in speed between the vehicle body 3 and the wheels 1FL and 1FR, 1RL and 1RR, and the errors in the pitch angular velocity ride on the wheel speeds VwFL and VwFR, VwRL and VwRR detected by the wheel speed sensors 11FL and 11FR, 11RL and 11RR, leading to incorrect pitch angular velocity fθp (the final pitch angular velocity dθp) determined by the wheel speeds VwFL and VwFR, VwRL and VwRR.

Consequently, according to the present embodiment, as shown in FIG. 8, the final pitch angular velocity dθp is returned to the pitching behavior computing section 54, and the pitching behavior computing section 54 (step S65 as shown in FIG. 9) subtracts the average front wheel speed VwF and average rear wheel speed VwR from the pitch angular velocity dθp to correct the pitch angular velocity fθp by excluding the influence caused by the error in the pitch angular velocity.

As shown in FIG. 8, the final pitch angular velocity dθp is also sent to the bounce behavior computing section 53, which then uses it to carry out the same correction as in step S65 shown in FIG. 9 for the average front wheel speed VwF and average rear wheel speed VwR.

In the bounce behavior computing section 53 (step S66 in FIG. 9), from the corrected average front wheel speed VwF and average rear wheel speed VwR, the displacements Xtf in the back-and-forth direction of the left/right front wheels 1FL and 1FR and the displacements in the back-and-forth direction Xtr of the left/right rear wheels 1RL and 1RR are determined; it then uses these displacements in the back-and-forth direction Xtf and Xtr of the front wheels and rear wheels to determine the up-and-down bounce movement Zv of the vehicle body 3 by computing using the equation (6), followed by time differentiation to determine the up-and-down bounce speed fZv of the vehicle body 3.

Next, in the band-pass filter processing section 55 shown in FIG. 8 (step S67 shown in FIG. 9), only the component near the resonance frequency of the vehicle body is extracted from the up-and-down bounce speed fZv of the vehicle body 3. Here, the component of the up-and-down bounce speed fZv passes through the band-pass filter, so that it is possible to determine the final up-and-down bounce speed dZv as the component of vibration of the up-and-down bounce speed fZv near the resonance frequency of the vehicle body.

The reason for extracting only the component near the resonance frequency of the vehicle body by a filtering process for the up-and-down bounce speed fZv of the vehicle body 3 is as follows: the up-and-down bounce speed fZv originally contains the variation in the wheel speed caused by acceleration/deceleration of the entirety of the vehicle and the noise components. It is thus necessary to remove these components from the up-and-down bounce speed fZv to obtain the final up-and-down bounce speed dZv representing only the vehicle body vibration.

As the vehicle body vibration (up-and-down bounce speed dZv and pitch angular velocity dθp) is estimated as mentioned previously, the correction quantity computing section 26 for the driving braking torque shown in FIG. 8 can compute the driving braking torque correction quantity ΔTd needed for suppressing the vehicle body vibration (up-and-down bounce speed dZv and pitch angular velocity dθp), and output it to the adder 24 as shown in FIG. 2.

The adder 24 shown in FIG. 2 corrects the requested torque rTd requested by the driver determined as mentioned previously at the computing unit 21 by a quantity corresponding to only the driving braking torque correction quantity ΔTd to determine the target torque tTd that can suppress the vehicle body vibration and can meet the request of the driver.

The motor torque instruction value computing section 23 shown in FIG. 2 limits or adjusts the target torque tTd to meet the request for the torque from another system 27 to determine the final motor torque instruction value tTm for realizing this purpose. The result is then sent via the inverter 8 to drive the motor 4.

<Effects>

As explained above, according to the present embodiment, the motor 4 is driven under control to suppress the vehicle body vibration (up-and-down bounce speed dZv and pitch angular velocity dθp) and to meet the requested torque rTd requested by the driver, so that it is possible to suppress the vehicle body vibration (up-and-down bounce speed dZv and pitch angular velocity dθp) and to improve the comfort of riding in the vehicle; it is also possible to ensure a stable posture of the vehicle body when the vehicle turns, so that it is possible to improve the steering stability, too.

In addition, on the basis of the prescribed correlation relationship (suspension geometry characteristics) between the displacement quantities in the back-and-forth direction Xtf and Xtr of the left/right front wheels 1FL and 1FR and the left/right rear wheels 1RL and 1RR with respect to the vehicle body 3, and the up-and-down displacement quantities Zf and Zr as shown in FIGS. 6 and 7, the vehicle body vibration (up-and-down bounce speed fZv and pitch angular velocity fθp) is estimated by computing from the average front wheel speed VwF and the average rear wheel speed VwR.

From the estimation results fZv and fθp, only the component near the resonance frequency of the vehicle body is extracted by the band-pass filter processing sections 55 and 56 (step S67 and step S64) to obtain the final up-and-down bounce speed dZv and the final pitch angular velocity dθp.

Consequently, without using the torques and forces, such as the spring constant, vehicle mass, etc., that vary corresponding to degradation over time and to the increase/decrease in the number of the occupants riding in the vehicle, the vehicle body vibration is estimated from the information related to the wheel speed, so that it is possible to increase the estimation precision, and, at the same time, it is possible to exclude the influence of the external disturbances.

Figure 10:
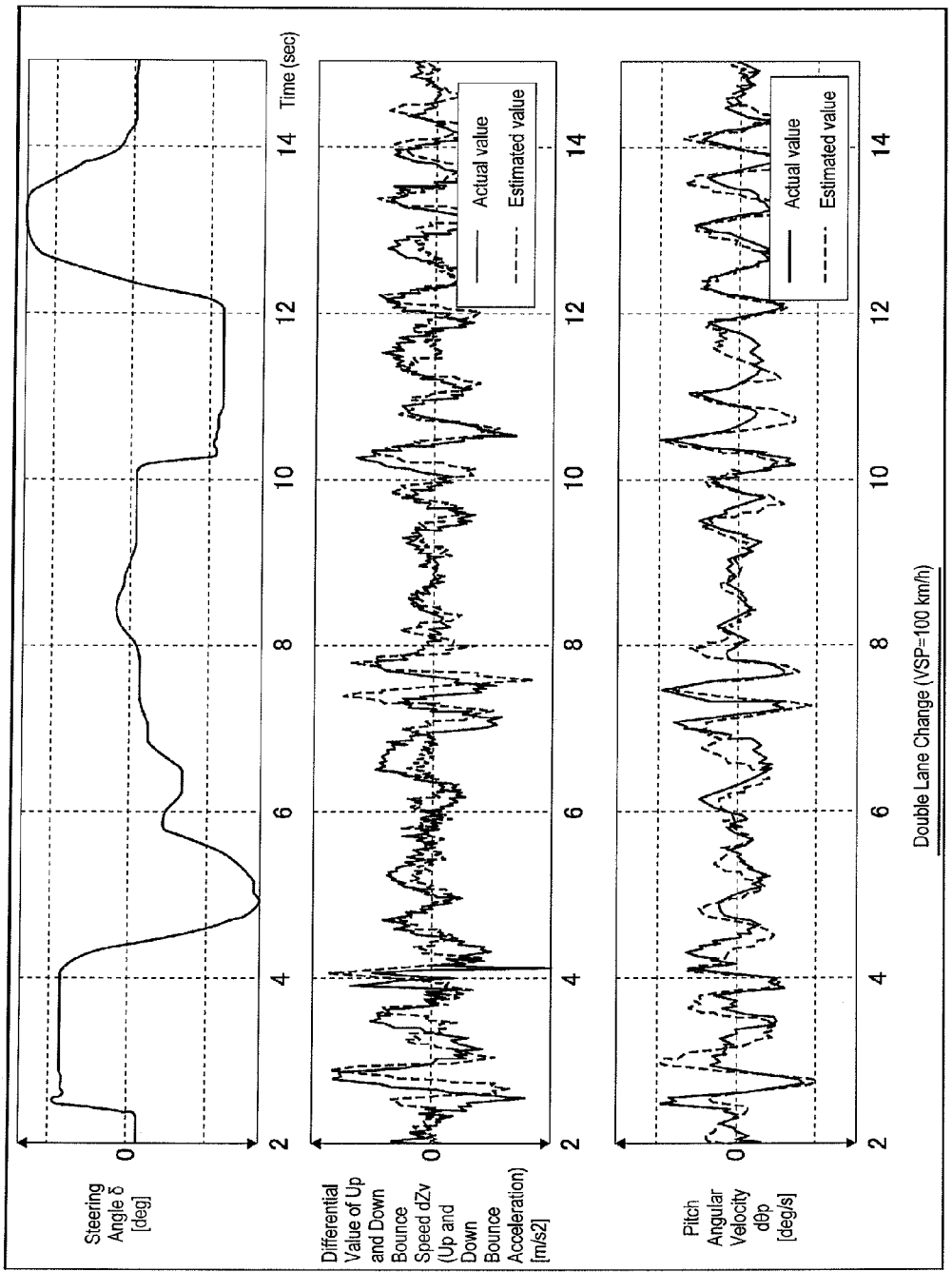
FIG. 10 is a time chart illustrating the operation of the second embodiment. It compares the vehicle body vibration estimated value of the vehicle body vibration estimating device with the measured value of the vehicle body vibration in the second embodiment of the present invention.

In this connection, in FIG. 10, as the results of estimation of the present embodiment, the variations over time of the pitch angular velocity dθp and the up-and-down bounce acceleration (the first differentiation of the up-and-down bounce speed dZv) in the case of double lane change running with the vehicle speed VSP=100 Km/h and the steering angle δ vary as shown in the drawing are shown as broken lines, respectively.

As can be seen from a comparison between the pitch angular velocity and the up-and-down bounce acceleration indicated by source lines, according to this embodiment, it is possible to estimate the vibration of the vehicle body 3 (up-and-down bounce speed dZv and pitch angular velocity dθp) at a high precision.

In addition, according to the present embodiment, the average front wheel speed VwF and the average rear wheel speed VwR adopted in estimating the vehicle body vibration (up-and-down bounce speed dZv and pitch angular velocity dθp) are corrected by subtracting the pitch angular velocity dθp to exclude the influence caused by the error in the pitch angular velocity in estimating the vehicle body vibration. Consequently, it is possible to exclude the influence caused by the error in the pitch angular velocity, and it is possible to increase the precision of estimation of the vehicle body vibration.

<Modified Examples of the First and Second Embodiments>

In the first and second embodiments, the vehicle body vibration estimating devices have been explained for the case in which they are adopted in the vehicle body vibration suppressing control via the driving braking force operation of an electric automobile with the motor 4 as the sole power source.

However, the scheme can also be adopted in the vehicle body vibration suppressing controller via engine control of the vehicle with an internal combustion engine or another engine as the power source; the scheme can also be adopted in the vehicle body vibration suppressing controller via the operation of a suspension device instead of the driving braking force operation of a motor or an engine.

Also, the wheel speed information adopted in estimating the vehicle body vibration is not limited to the average front wheel speed VwF and average rear wheel speed VwR as shown in the drawing; it may also be adopted in estimating the vehicle body vibration on the basis of a 4-wheel model where the wheel speeds VwFL and VwFR, VwRL and VwRR are individually adopted.

In this case, the estimated vehicle body vibration is not limited to the pitch angular velocity dθp and up-and-down bounce speed dZv of the example shown in the drawing. It is also easy to estimate the roll movement and other vibrations of the vehicle body.

In the first embodiment, when the frequency component indicating the vehicle body vibration (the back-and-forth movement component of the wheels with respect to 3) is fetched from the average front wheel speed VwF and the average rear wheel speed VwR, a band-pass filter extracting only the component near the resonance frequency of the vehicle body from the average front wheel speed VwF and the average rear wheel speed VwR is adopted to obtain the vibration component fVwF near the vehicle body resonance frequency of the average front wheel speed VwF and the vibration component fVwR near the vehicle body resonance frequency of the average rear wheel speed VwR, which are adopted in estimating the vehicle body vibration. However, instead of the information, it is also possible to use the following wheel speed information.

That is, the following scheme may also be adopted: a means for accurately detecting or estimating the vehicle speed as the speed of the vehicle body 3 with respect to the ground is provided; the errors between the vehicle speed and the average front wheel speed VwF and the average rear wheel speed VwR are adopted instead of the vibration component fVwF near the vehicle body resonance frequency of the average front wheel speed VwF and the vibration component fVwR near the vehicle body resonance frequency of the average rear wheel speed VwR in estimating the vehicle vibration.

Here, in consideration of the slip rate difference between the driving wheels and the driven wheels, etc., this scheme is unfavorable with respect to the precision in estimating the vehicle body vibration, and the scheme whereby the vibration component fVwF near the vehicle body resonance frequency of the average front wheel speed VwF and the vibration component fVwR near the vehicle body resonance frequency of the average rear wheel speed VwR obtained using the band-pass filter as that in the first embodiment are adopted is better for practical application.

In addition, instead of the scheme whereby the vibration component fVwF near the vehicle body resonance frequency of the average front wheel speed VwF and the vibration component fVwR near the vehicle body resonance frequency of the average rear wheel speed VwR are acquired as in the first embodiment, as a simpler scheme, one may also adopt the component obtained by removing the average front wheel speed VwF and the average rear wheel speed VwR in estimating the vehicle body vibration.

In the second embodiment, by carrying out the band-pass filtering process, only the component near the resonance frequency of the vehicle body is extracted from the up-and-down bounce speed fZv and the pitch angular velocity fθp of the vehicle body 3 determined from the average front wheel speed VwF and the average rear wheel speed VwR, and the final up-and-down bounce speed dZv and the pitch angular velocity dθp representing only the vehicle body vibration are obtained.

However, instead of the scheme, one may also adopt a scheme in which the filtering process is carried out to remove the drift component from the up-and-down bounce speed fZv and the pitch angular velocity fθp, or filtering process is carried out to remove the low frequency component lower than the frequency component near the resonance frequency of the vehicle body, to obtain the final up-and-down bounce speed dZv and pitch angular velocity dθp.

In addition, one may also adopt a scheme in which a differentiator is arranged so that when the vehicle body vibration (up-and-down bounce speed dZv and pitch angular velocity dθp) is estimated, the average front wheel speed VwF and the average rear wheel speed VwR are differentiated to be converted to the wheel acceleration information, and, on the basis of the wheel acceleration information from the differentiator, the up-and-down bounce speed dZv and the pitch angular velocity dθp are estimated.

Finally, one may also adopt the following scheme: when the vehicle body vibration (up-and-down bounce speed dZv and pitch angular velocity dθp) is estimated, the state equation that estimates the vehicle body vibration from the driving braking torque on the vehicle is added, with the vehicle body vibration (up-and-down bounce speed dZv and pitch angular velocity dθp) as the estimation result being taken as the observer input to the state equation to estimate the vehicle body vibration (up-and-down bounce speed dZv and pitch angular velocity dθp).

In this case, while the precision in estimating the vehicle body vibration and the robust property with respect to the external disturbances can be maintained as is, it is easy to adopt the feed forward estimation by the driving torque and to adopt the form of the state equation that can be readily adopted in control operation.

Third Embodiment

<Configuration>

Figure 11:
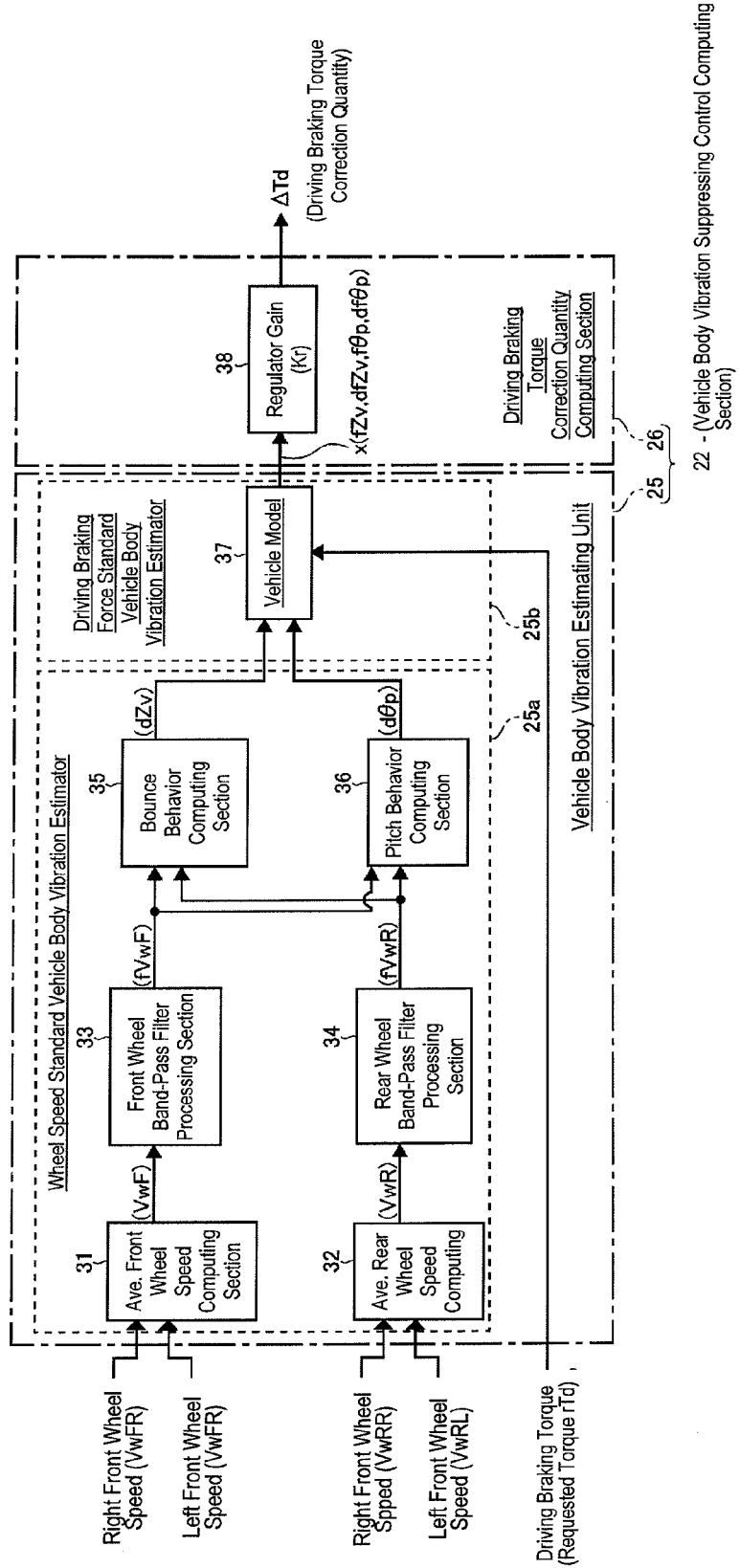
FIG. 11 is a block diagram illustrating the functions of the vehicle body vibration suppressing control computing section corresponding to FIG. 3. It shows the vehicle body vibration estimating device and the vehicle body vibration suppressing controller in the third embodiment of the present invention.

FIG. 11 shows the vehicle body vibration estimating device and vehicle body vibration suppressing controller related to the third embodiment. It is a block diagram illustrating the functions of the vehicle body vibration suppressing control computing section 22 corresponding to that shown in FIG. 3.

Figure 12:
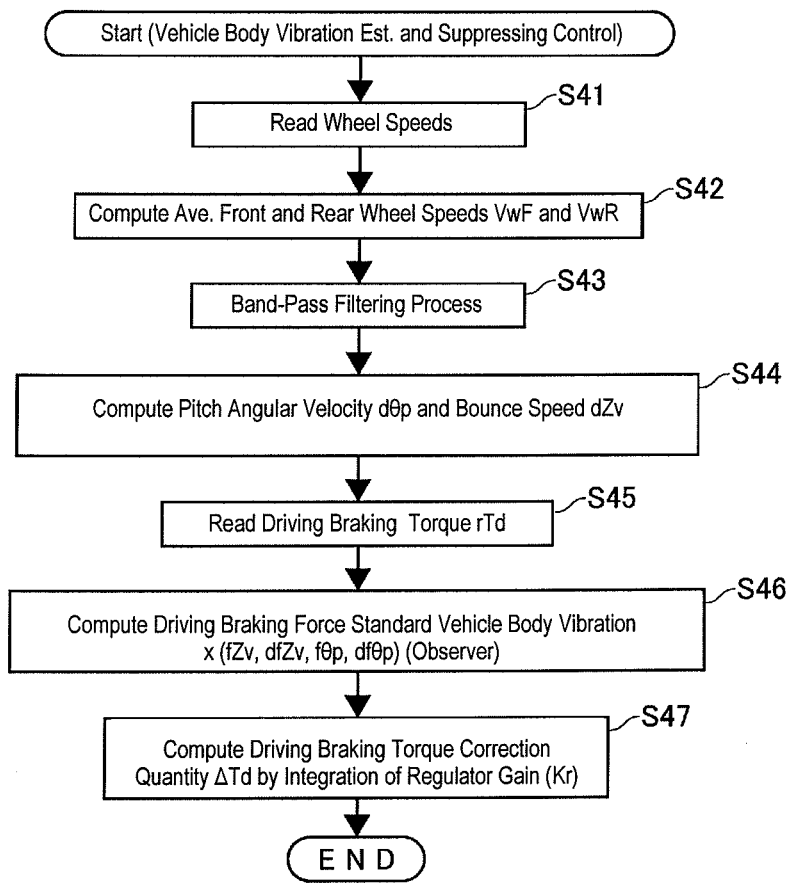
FIG. 12 is a flow chart illustrating the control program executed by the vehicle body vibration estimating section in FIG. 11 and the driving braking torque correction quantity computing section to estimate the vehicle body vibration and, at the same time, to compute the torque correction quantity for suppressing the vehicle body vibration.

FIG. 12 is a flow chart illustrating the control program executed by the vehicle body vibration suppressing control computing section 22 shown in FIG. 11 for estimating the vehicle body vibration and, at the same time, for computing the torque correction quantity for suppressing the vehicle body vibration.

In this embodiment, the vehicle body vibration suppressing control system is the same as that shown in FIG. 1, and the motor controller 6 is the same as that shown in FIG. 2. Consequently, explanation of the vehicle body vibration suppressing control system and the motor controller 6 on the basis of these drawings will not be repeated, and, in the following, only the features different from those in the first embodiment will be explained with reference to FIGS. 11 and 12.

<Vehicle Body Vibration Estimation and Vehicle Body Vibration Suppressing Control>

The vehicle body vibration estimating unit 25 and the correction quantity computing section 26 inside the vehicle body vibration suppressing control computing section 22 have the configuration shown in the block diagram in FIG. 11. While the control program shown in FIG. 12 is executed to estimate the vibration of the vehicle body 3 (in this embodiment, the pitch angle fθp, the pitch angular velocity dfθp, as well as the up-and-down bounce quantity fZv as the up-and-down displacement quantity, and the bounce speed dfZv), at the same time, it is used to compute the driving braking torque correction quantity ΔTd needed for suppressing the estimated vehicle body vibration (fθp, dfθp, fZv, dfZv).

As shown in FIG. 11, the vehicle body vibration estimating unit 25 is comprised a wheel speed standard vehicle body vibration estimating unit 25a (the wheel speed physical quantity standard vehicle body vibration estimating means in this invention) and a driving braking force standard vehicle body vibration estimating unit 25b (the driving braking force standard vehicle body vibration estimating means in this invention).

First of all, in step S41 shown in FIG. 12, the wheel speed standard vehicle body vibration estimating unit 25a shown in FIG. 11 is adopted to read the left/right front wheel speeds VwFL and VwFR and the left/right rear wheel speeds VwRL and VwRR.

As shown in FIG. 11, just as the vehicle body vibration estimating unit 25 shown in FIG. 3, the wheel speed standard vehicle body vibration estimating unit 25a is also comprised of an average front wheel speed computing section 31 and an average rear wheel speed computing section 32, a front wheel band-pass filter processing section 33, a rear wheel band-pass filter processing section 34, a bounce behavior computing section 35 and a pitching behavior computing section 36.

The average front wheel speed computing section 31 and the average rear wheel speed computing section 32 in FIG. 11 (step S42 as shown in FIG. 12) compute the average front wheel speed VwF=(VwFL+VwFR)/2 from the left/right front wheel speeds VwFL and VwFR, and, at the same time, they compute the average rear wheel speed VwR=(VwRL+VwRR)/2 from the left/right rear wheel speeds VwRL and VwRR.

The front wheel band-pass filter processing section 33 and the rear wheel band-pass filter processing section 34 shown in FIG. 11 (step S43 shown in FIG. 12) are then adopted to filter the average front wheel speed VwF and the average rear wheel speed VwR so that only the components near the resonance frequency of the vehicle body are extracted from the average front wheel speed VwF and the average rear wheel speed VwR to obtain the vibration component fVwF near the vehicle body resonance frequency of the average front wheel speed VwF and the vibration component fVwR near the vehicle body resonance frequency of the average rear wheel speed VwR.

The bounce behavior computing section 35 and the pitching behavior computing section 36 shown in FIG. 11 (step S44 shown in FIG. 12) then determine the up-and-down bounce speed dZv and the pitch angular velocity dθp of the vehicle body 3 as the wheel speed standard vehicle body vibration from the vibration component fVwF near the vehicle body resonance frequency of the average front wheel speed VwF and the vibration component fVwR near the vehicle body resonance frequency of the average rear wheel speed VwR as follows.

For the bounce behavior computing section 35 and pitching behavior computing section 36 shown in FIG. 11 (step S44 as shown in FIG. 12), the method of determining the wheel speed standard vehicle body vibration (up-and-down bounce speed dZv and pitch angular velocity dθp of the vehicle body 3) from the wheel speed vibration components fVwF and fVwR is the same as that described with reference to FIGS. 5-7.

That is, from the vibration component fVwF near the vehicle body resonance frequency of the average front wheel speed and the vibration component fVwR near the vehicle body resonance frequency of the average rear wheel speed obtained using the band-pass filter processing sections 33 and 34 shown in FIG. 11 (step S43 shown in FIG. 12) to extract only the wheel speed components representing the vehicle body vibration, the displacements Xtf in the back-and-forth direction of the left/right front wheels 1FL and 1FR and the displacements in the back-and-forth direction Xtr of the left/right rear wheels 1RL and 1RR are determined, respectively, and by substituting the time differential values dXtf and dXtf of these displacements in the back-and-forth direction Xtf and Xtr into the equations (7) and (8), the wheel speed standard vehicle body vibration (up-and-down bounce speed dZv and pitch angular velocity dθp) can be computed and estimated, respectively.

While an estimation is carried out for the wheel speed standard vehicle body vibration (up-and-down bounce speed dZv and pitch angular velocity dθp), in step S45 shown in FIG. 12, the driving braking force standard vehicle body vibration estimating unit 25b shown in FIG. 11 reads the requested torque rTd determined by the computing section 21 shown in FIG. 2 as the driving braking torque of the vehicle.

As shown in FIG. 11, the driving braking force standard vehicle body vibration estimating unit 25b has a vehicle model 37. In step S46 shown in FIG. 12, the wheel speed standard vehicle body vibration (up-and-down bounce speed dZv and pitch angular velocity dθp) is taken as the observer input, and the vehicle model 37 is adopted in estimating the state by the observer from the requested torque rTd (the driving braking torque of the vehicle) to compute and estimate the driving braking force standard vehicle body vibration (up-and-down bounce speed fZv, up-and-down bounce speed dfZv, pitch angle fθp, pitch angular velocity dfθp).

Figure 13:
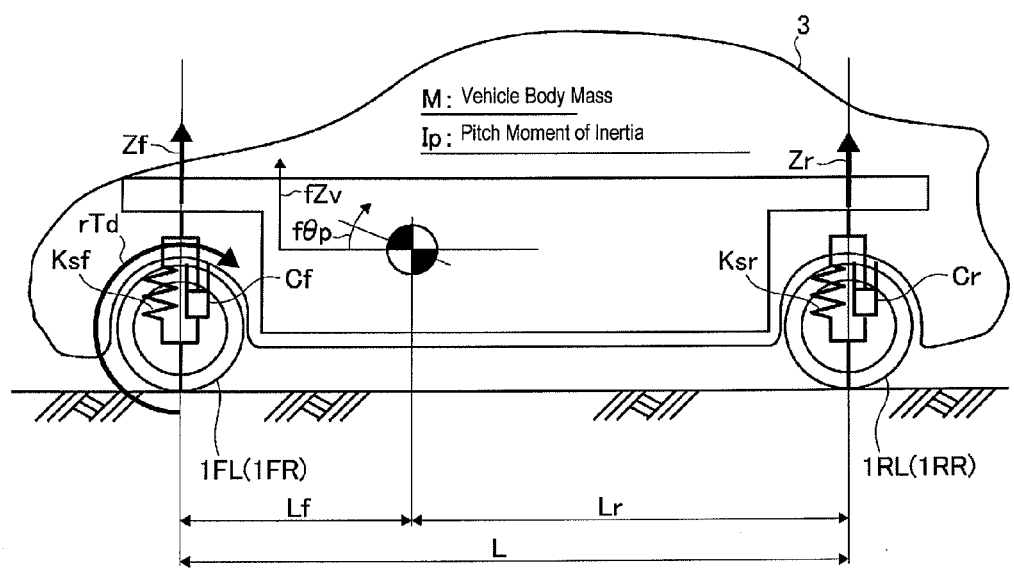
FIG. 13 is a diagram illustrating the vehicle movement model.

FIG. 13 is a diagram illustrating the basic vehicle model 37 that forms the observer. Just as in the case shown in FIG. 5, suppose Lf represents the distance between the center of gravity and the front axle in the wheel base L, while Ksf and Cf represent the spring constant and vibration-damping coefficient of the front wheel suspension device, respectively, Ksr and Cr represent the spring constant and the vibration-damping coefficient of the rear wheel suspension device, respectively, M represents the mass of the vehicle body 3, and Ip represents the pitching inertial moment of the vehicle body 3, when a driving braking torque rTd is applied on this vehicle.

The driving braking force standard vehicle body vibration (up-and-down bounce speed fZv and pitch angle fθp) at the center of gravity of the vehicle body 3 is represented by both the up-and-down displacements Zf at the site above the front axle of the vehicle body 3 and the up-and-down displacements Zr at the site above the rear axle of the vehicle body 3.

In the vehicle model shown in FIG. 13, the motion equations related to the driving braking force standard vehicle body vibration (up-and-down bounce quantity fZv and pitch angle fθp) can be represented as follows, with the differential operator simply represented as "d".

$$M \cdot ddfZv = -2Ksf(fZv+Lf \cdot f\theta p)-2Cf(dfZv+Lf \cdot df\theta p)-2Ksr(fZv-Lr \cdot f\theta p)-2Cr(dfZv-Lr \cdot df\theta p) \quad (9)$$

$$Ip \cdot ddf\theta p = -2Lf\{Ksf(fZv+Lf \cdot f\theta p)+Cf(dfZv+Lf \cdot df\theta p)\}+2Lr\{Ksr(fZv-Lr \cdot f\theta p)+Cr(dfZv-Lr \cdot df\theta p)\}+rTd \quad (10)$$

These motion equations are converted to state equations, with the driving braking torque rTd being taken as the input in computing and estimating the pitching movement (pitch angle fθp and pitch angular velocity dfθp) and the up-and-down bounce movement (up-and-down bounce quantity fZv and up-and-down bounce speed dfZv).

However, if this operation is carried out as is, the estimation precision is low due to the error in modeling and the external disturbances (bumps/dips of the road surface), etc.

According to the present embodiment, in step S46 shown in FIG. 12, the driving braking force standard vehicle body vibration estimating unit 25b shown in FIG. 11 uses the vehicle model 37 to estimate the state by the observer from the requested torque rTd (the driving braking torque of the vehicle), and the driving braking force standard vehicle body vibration x (up-and-down bounce quantity fZv, up-and-down bounce speed dfZv, pitch angle fθp, pitch angular velocity dfθp) is computed and estimated.

In this case, as shown in FIG. 11, the wheel speed standard vehicle body vibration (up-and-down bounce speed dZv and pitch angular velocity dθp) is also input as observer input from the computing sections 35 and 36, and the vehicle model 37 is adopted in computing the driving braking force standard vehicle body vibration x (up-and-down bounce quantity fZv, up-and-down bounce speed dfZv, pitch angle fθp, pitch angular velocity dfθp) from the requested torque rTd (the driving braking torque of the vehicle).

In this way, the driving braking force standard vehicle body vibration estimating unit 25b shown in FIG. 11 also takes the wheel speed standard vehicle body vibration (up-and-down bounce speed dZv and pitch angular velocity dθp) as the observer input and, on the basis of vehicle model 37, the driving braking force standard vehicle body vibration x (up-and-down bounce quantity fZv, up-and-down bounce speed dfZv, pitch angle fθp, pitch angular velocity dfθp) is computed from the requested torque rTd (the driving braking torque of the vehicle).

The driving braking force standard vehicle body vibration estimating unit 25b (the vehicle model 37) can meet both the demand on a robust property resistance to external disturbances and the demand on a high stability.

Also, because it is possible to estimate the driving braking force standard vehicle body vibration x from the requested torque rTd (the driving braking torque of the vehicle), which is the cause of the vehicle body vibration, before generation of the vehicle body vibration instead of after the generation of the vehicle body vibration, it is possible to conduct a feed forward estimation of the driving braking force standard vehicle body vibration x (up-and-down bounce quantity fZv, up-and-down bounce speed dfZv, pitch angle fθp, pitch angular velocity dfθp) as the final vehicle body vibration.

In step S47 shown in FIG. 12, the correction quantity computing section 26 shown in FIG. 11 computes the driving braking torque correction quantity ΔTd needed for suppressing the driving braking force standard vehicle body vibration x (up-and-down bounce quantity fZv, up-and-down bounce speed dfZv, pitch angle fθp, pitch angular velocity dfθp) as the final vehicle body vibration as follows.

That is, the driving braking force standard vehicle body vibration x (up-and-down bounce quantity fZv, up-and-down bounce speed dfZv, pitch angle fθp, pitch angular velocity dfθp) is multiplied by the regulator gain Kr indicated by key "38" in FIG. 11, and the linear sum of the product values obtained as the results is taken as the driving braking torque correction quantity ΔTd.

In this case, the regulator gain Kr is defined as the weight applied for adjusting the degree in suppressing (alleviating) the up-and-down bounce quantity fZv, up-and-down bounce speed dfZv, pitch angle fθp, and pitch angular velocity dfθp as the final vehicle body vibration. This is preferred since it can increase the degree of freedom in the design.

In addition, the regulator gain Kr may be composed of multiple regulator gains that are set by changing the weighting pattern of the suppression (alleviating) degree for each set of the vehicle body vibration, that is, for the up-and-down bounce quantity fZv, up-and-down bounce speed dfZv, pitch angle fθp, pitch angular velocity dfθp.

The sum of the products between the multiple regulator gains and the up-and-down bounce quantity fZv, up-and-down bounce speed dfZv, pitch angle fθp, pitch angular velocity dfθp may be taken as the driving braking torque correction quantity ΔTd.

In addition, one may also adopt the following scheme: the tuning gains are set corresponding to the multiple regulator gains, with the sum of the products of the up-and-down bounce quantity fZv, up-and-down bounce speed dfZv, pitch angle fθp, pitch angular velocity dfθp, the multiple regulator gains, and the tuning gains being taken as the driving braking torque correction quantity ΔTd.

The driving braking torque correction quantity ΔTd determined by the driving braking torque correction quantity computing section 26 shown in FIG. 11 (step S47 shown in FIG. 12) is sent to the adder 24 shown in FIG. 2.

The adder 24 corrects the requested torque rTd requested by the driver and determined by the computing section 21 as mentioned previously by the driving braking torque correction quantity ΔTd for suppressing the vehicle body vibration, so that the target torque tTd that can meet the request of the driver is determined while suppressing the vehicle body vibration.

The motor torque instruction value computing section 23 shown in FIG. 2 limits or adjusts the target torque tTd to meet the request for torque by another system 27, so that the final motor torque instruction value tTm for realizing this is determined, and it is then sent via the inverter 8 to control driving of the motor 4.

Figure 14:
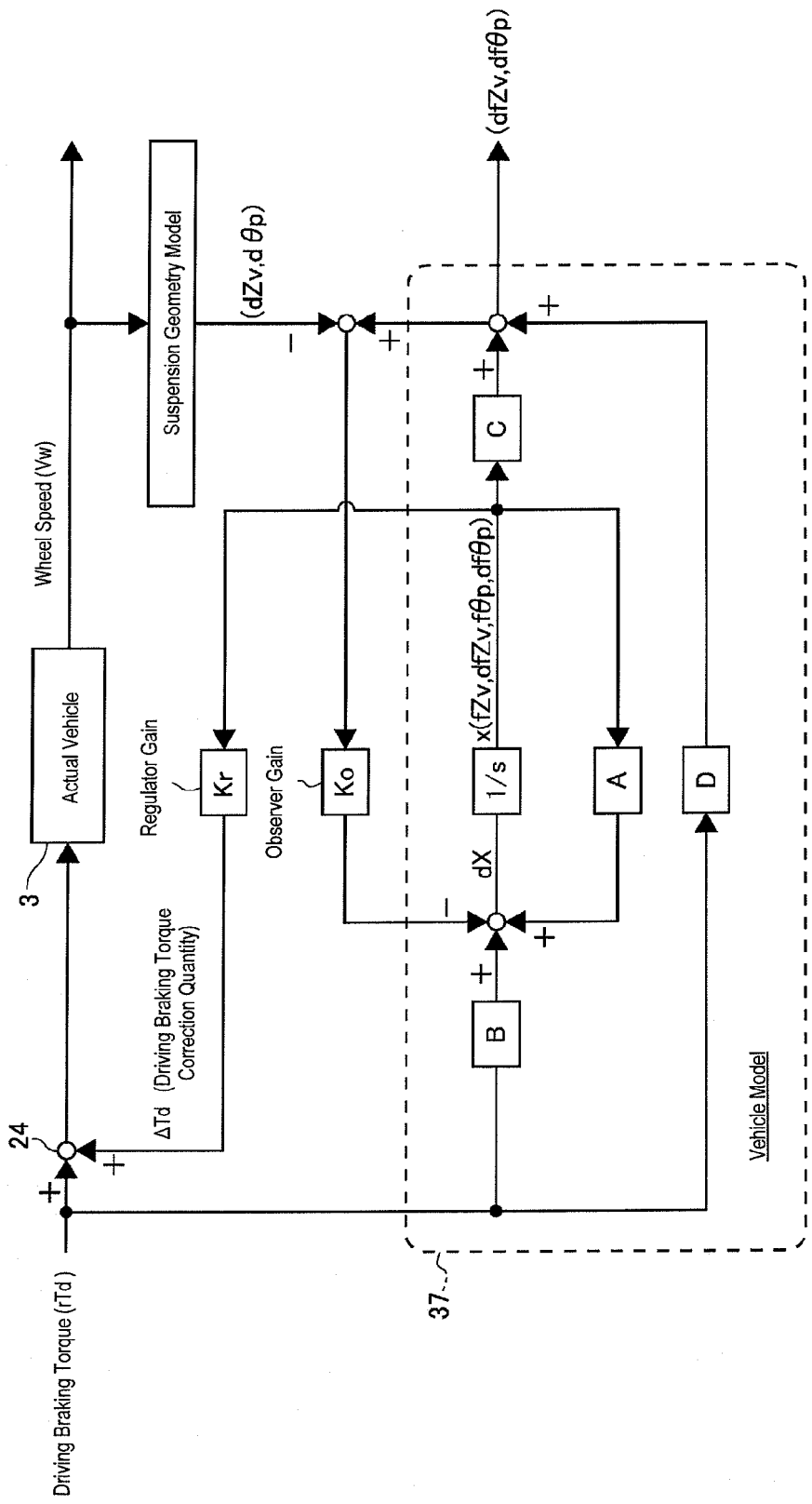
FIG. 14 is a schematic system diagram illustrating the vehicle body vibration estimation process and the vehicle body vibration suppressing process in the third embodiment of the present invention.

FIG. 14 shows the flow of the vehicle body vibration estimation and the vehicle body vibration suppressing control in this embodiment.

In FIG. 14, A, B, C, and D represent the A, B, C, and D matrix when the vehicle model shown in FIG. 13 is represented by the state equations, and Ko represents the observer gain with respect to the observer input (dZv, dθp, dfZv, dfθp).

<Effects>

As explained above, according to the vehicle body vibration suppressing control in this embodiment, the motor 4 is subjected to driving control to meet the requested torque rTd requested by the driver while suppressing the driving braking force standard vehicle body vibration x (up-and-down bounce quantity fZv, up-and-down bounce speed dfZv, pitch angle fθp, pitch angular velocity dfθp).

Since the driving braking force standard vehicle body vibration x (up-and-down bounce quantity fZv, up-and-down bounce speed dfZv, pitch angle fθp, pitch angular velocity dfθp) can be suppressed, it is possible to improve the comfort of riding in the vehicle; it is also possible to have a stable posture of the vehicle body when the vehicle turns, and it is possible to improve the steering stability.

In addition, according to the present embodiment, when the driving braking force standard vehicle body vibration x (up-and-down bounce quantity fZv, up-and-down bounce speed dfZv, pitch angle fθp, pitch angular velocity dfθp) is estimated:

on the basis of the prescribed correlation relationship (suspension geometry characteristics) shown as examples in FIGS. 6 and 7 between the displacements in the back-and-forth direction Xtf and Xtr and the up-and-down displacements Zf and Zr of the left/right front wheels 1FL and 1FR and the left/right rear wheels 1RL and 1RR with respect to the vehicle body 3, the wheel speed standard vehicle body vibration (up-and-down bounce speed dZv and pitch angular velocity dθp) is estimated from the vibration component fVwF near the vehicle body resonance frequency of the average front wheel speed VwF and the vibration component fVwR near the vehicle body resonance frequency of the average rear wheel speed VwR.

Next, the wheel speed standard vehicle body vibration (up-and-down bounce speed dZv and pitch angular velocity dθp) is taken as the observer input and, from the requested torque rTd (driving braking force of the vehicle), the vehicle model 37 is used to estimate the driving braking force standard vehicle body vibration x (up-and-down bounce quantity fZv, up-and-down bounce speed dfZv, pitch angle fθp, pitch angular velocity dfθp) as the final vehicle body vibration. Consequently, the following operation and effects can be realized.

First of all, without adding the suspension stroke sensor as adopted in the prior art, it is possible to estimate the final driving braking force standard vehicle body vibration x (up-and-down bounce quantity fZv, up-and-down bounce speed dfZv, pitch angle fθp, and pitch angular velocity dfθp), and this is favorable in terms of cost.

In addition, without using the torques and forces, such as the spring constant, vehicle mass, etc., that vary corresponding to degradation over time and to the increase/decrease in the number of the occupants riding in the vehicle, it is possible to estimate the wheel speed standard vehicle body vibration (up-and-down bounce speed dZv and pitch angular velocity dθp) from the information related to the wheel speeds, that is, the vibration component fVwF near the vehicle body resonance frequency of the average front wheel speed VwF and the vibration component fVwR near the vehicle body resonance frequency of the average rear wheel speed VwR. Consequently, it is possible to increase the precision of estimation.

In addition, while the high precision wheel speed standard vehicle body vibration (up-and-down bounce speed dZv and pitch angular velocity dθp) is taken as the observer input, the vehicle model 37 is adopted to estimate the driving braking force standard vehicle body vibration x (up-and-down bounce quantity fZv, up-and-down bounce speed dfZv, pitch angle fθp, pitch angular velocity dfθp) as the final vehicle body vibration from the requested torque rTd (the driving braking force of the vehicle).

This driving braking force standard vehicle body vibration (the final vehicle body vibration) x can also have an excellent, high precision with respect to the robust property resistance to the external disturbances, and the effect by the vibration suppressing control can become significant.

Also, if the wheel speed standard vehicle body vibration (up-and-down bounce speed dZv and pitch angular velocity dθp) is taken as the final vehicle body vibration as is, and the wheel speed standard vehicle body vibration (up-and-down bounce speed dZv and pitch angular velocity dθp) is that after generation of the vehicle body vibration, when feed forward control is conducted for the vehicle body vibration suppressing control, the estimation of the final vehicle body vibration is too slow, which is unfavorable.

According to the vehicle body vibration estimating device of the present embodiment, the wheel speed standard vehicle body vibration (up-and-down bounce speed dZv and pitch angular velocity dθp) is taken as the observer input, and the driving braking force standard vehicle body vibration x (up-and-down bounce quantity fZv, up-and-down bounce speed dfZv, pitch angle fθp, pitch angular velocity dfθp) estimated using the vehicle model 37 from the driving braking force rTd of the vehicle before the generation of the vehicle body vibration is taken as the final vehicle body vibration. Consequently, even when the feed forward control is carried out for the vehicle body vibration suppressing control, estimation of the final vehicle body vibration is not very slow.

For the vehicle body vibration estimating device of the present embodiment, as explained above, the driving braking torque correction quantity ΔTd needed for alleviating the final vehicle body vibration x is computed; this driving braking torque correction quantity ΔTd is used to correct the driving braking force rTd of the vehicle.

Consequently, for the estimated final vehicle body vibration x, together with the excellent robust property to the external disturbances and the high precision, the vehicle body vibration can always be alleviated.

Fourth Embodiment

<Configuration>

Figure 15:
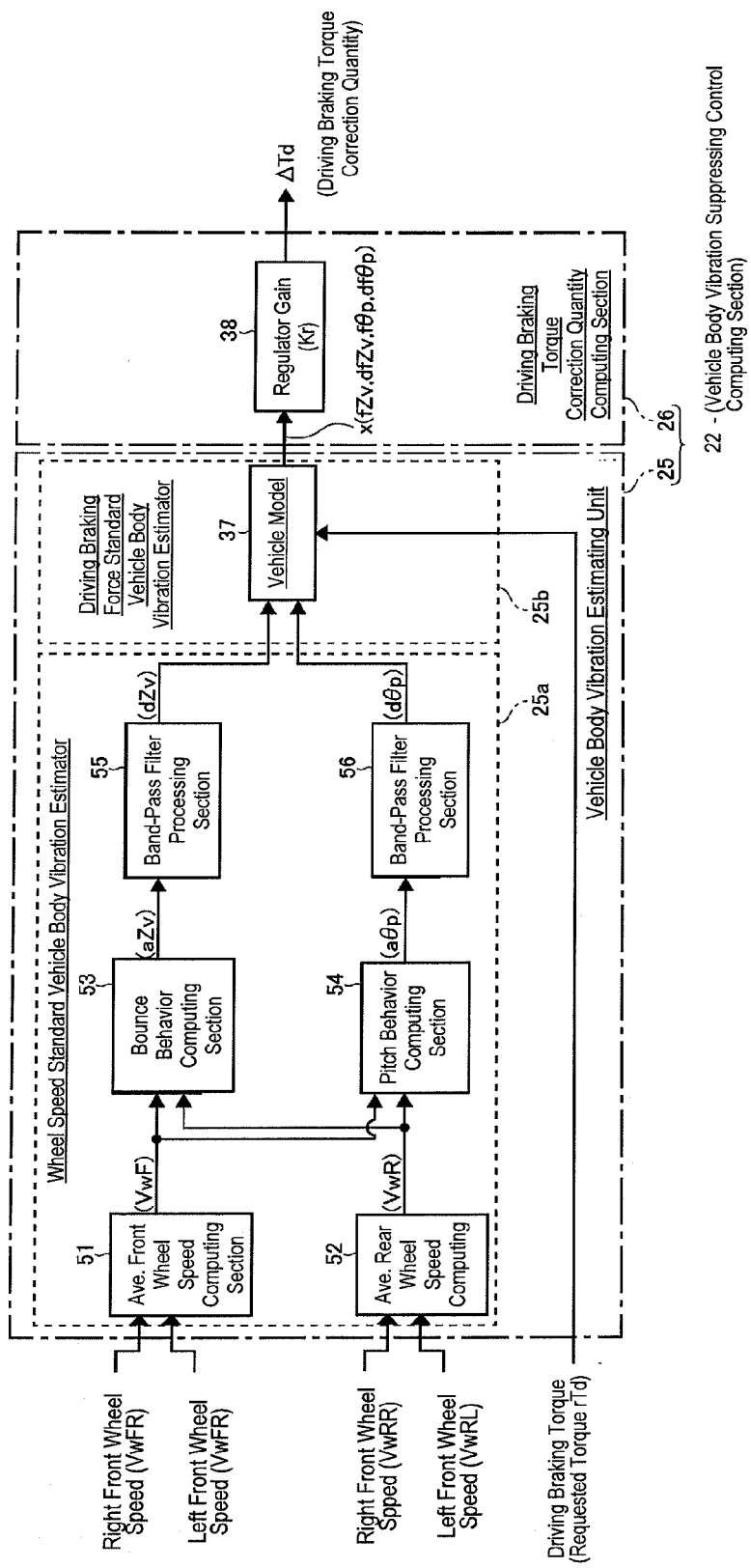
FIG. 15 is a block diagram illustrating the functions of the vehicle body vibration suppressing control computing section corresponding to FIG. 11. It shows the vehicle body vibration estimating device and the vehicle body vibration suppressing controller in the fourth embodiment of the present invention.
Figure 16:
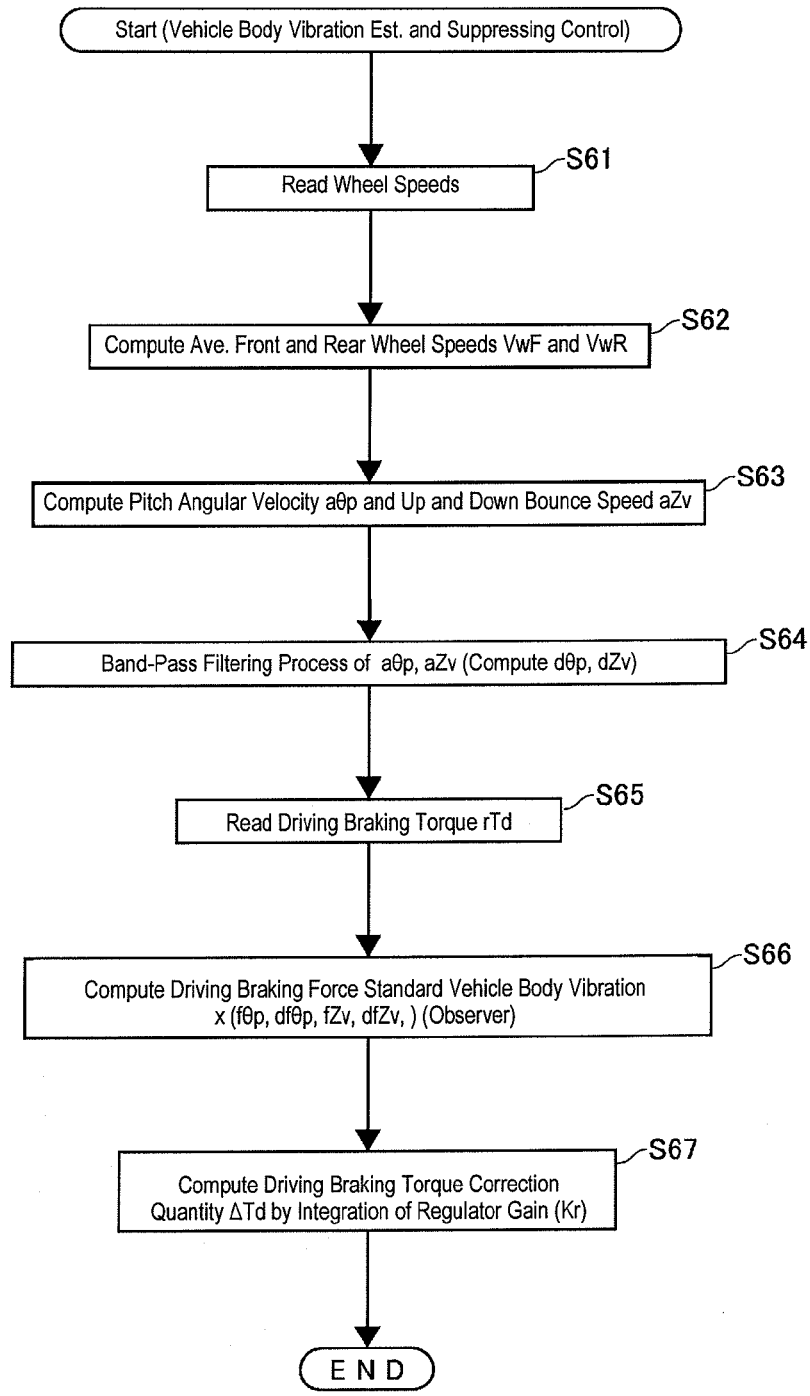
FIG. 16 is a flow chart corresponding to FIG. 12. It shows the control program executed by the vehicle body vibration estimating section and the driving braking torque correction quantity computing section in FIG. 15 for computing the driving braking torque correction quantity needed for estimating the vehicle body vibration and for suppressing the vehicle body vibration.

FIGS. 15 and 16 show the vehicle body vibration estimating device and the vehicle body vibration suppressing controller related to the fourth embodiment of the present invention. FIG. 15 is a block diagram of the vehicle body vibration suppressing control computing section 22 corresponding to FIG. 11 and FIG. 16 shows the vehicle body vibration estimation and the vehicle body vibration suppressing control program executed by the vehicle body vibration suppressing control computing section 22. It is a flow chart corresponding to FIG. 12.

Just as in the third embodiment, in this embodiment, the vehicle body vibration suppressing control system is the same as that shown in FIG. 1, and the motor controller 6 is the same as that shown in FIG. 2. Consequently, explanation of the vehicle body vibration suppressing control system and the motor controller 6 on the basis of these drawings will not be repeated, and, in the following, only the features different from those in the third embodiment will be explained with reference to FIGS. 15 and 16.

<Vehicle Body Vibration Estimation and Vehicle Body Vibration Suppressing Control>

In this embodiment, the vehicle body vibration estimating unit 25 inside the vehicle body vibration suppressing control computing section 22 has the configuration shown in the block diagram in FIG. 15. While the control program shown in FIG. 16 is executed by the vehicle body vibration estimating unit 25 to estimate the vibration of the vehicle body 3 (in this embodiment, just as in the third embodiment, the pitch angle fθp, the pitch angular velocity dfθp, the up-and-down bounce quantity fZv, and the up-and-down bounce speed dfZv).

First of all, in step S61 shown in FIG. 16, the wheel speed standard vehicle body vibration estimating unit 25a inside the vehicle body vibration estimating unit 25 reads the left/right front wheel speeds VwFL and VwFR and the left/right rear wheel speeds VwRL and VwRR as shown in FIG. 15.

The average front wheel speed computing section 51 and the average rear wheel speed computing section 52 shown in FIG. 15 (step S62 in FIG. 16), then compute the average front wheel speed VwF=(VwFL+VwFR)/2 from the left/right front wheel speeds VwFL and VwFR and, at the same time, compute the average rear wheel speed VwR=(VwRL+VwRR)/2 from the left/right rear wheel speeds VwRL and VwRR.

Next, the bounce behavior computing section 53 shown in FIG. 15 (step S63 in FIG. 16) determines the displacements Xtf in the back-and-forth direction of the left/right front wheels 1FL and 1FR (see FIG. 5) and the displacements in the back-and-forth direction Xtr of the left/right rear wheels 1RL and 1RR (see FIG. 5) with respect to the vehicle body from the average front wheel speed VwF and the average rear wheel speed VwR. These displacements in the back-and-forth direction Xtf and Xtr of the front wheels and rear wheels are then used to compute the up-and-down bounce movement Zv (see FIG. 5) of the vehicle body 3 by the equation (6). It is then time differentiated to determine the up-and-down bounce speed aZv of the vehicle body 3.

The pitching behavior computing section 54 shown in FIG. 15 (step S63 shown in FIG. 16) determines the displacements Xtf in the back-and-forth direction of the left/right front wheels 1FL and 1FR (see FIG. 5) and the displacements in the back-and-forth direction Xtr of the left/right rear wheels 1RL and 1RR (see FIG. 5) with respect to the vehicle body from the average front wheel speed VwF and the average rear wheel speed VwR, and these displacements in the back-and-forth direction Xtf and Xtr of the front wheels and rear wheels are used to determine the pitching movement θp of the vehicle body 3 (see FIG. 5) by computing using the equation (5), and it is time differentiated to determine the pitch angular velocity θp of the vehicle body 3.

Next, the band-pass filter processing section 55 shown in FIG. 15 (step S64 shown in FIG. 16) has the up-and-down bounce speed aZv pass through the band-pass filter that extracts only the component near the resonance frequency of the vehicle body from the up-and-down bounce speed aZv of the vehicle body 3 determined by the bounce behavior computing section 53 shown in FIG. 15 (step S63 shown in FIG. 16) to determine the up-and-down bounce speed dZv (the wheel speed standard vehicle body vibration) as the vibration component of the up-and-down bounce speed aZv near the resonance frequency of the vehicle body.

The reason for extracting only the component near the resonance frequency of the vehicle body by the filtering process for the up-and-down bounce speed aZv of the vehicle body 3 is as follows. That is, the wheel speed standard up-and-down bounce speed aZv contains the variation in the wheel speed caused by acceleration/deceleration of the entirety of the vehicle and the noise components. Consequently, it is necessary to remove them from the up-and-down bounce speed a Zv, so that the wheel speed standard up-and-down bounce speed dZv represents only the vehicle body vibration.

In the band-pass filter processing section 56 shown in FIG. 15 (step S64 as shown in FIG. 16), the pitch angular velocity aθp determined by the pitching behavior computing section 54 shown in FIG. 15 (step S63 shown in FIG. 16) is then fed through the band-pass filter for extracting only the component of the pitch angular velocity aθp of the vehicle body 3 near the resonance frequency of the vehicle body to determine the component of the pitch angular velocity aθp near the resonance frequency of the vehicle body (the wheel speed standard vehicle body vibration).

The reason for extracting only the component near the resonance frequency of the vehicle body from the pitch angular velocity aθp of the vehicle body 3 by the filtering process is as follows. That is, the pitch angular velocity aθp contains the variation in the wheel speed caused by acceleration/deceleration of the entirety of the vehicle and the noise components, and they should be excluded from the pitch angular velocity aθp to have the wheel speed standard pitch angular velocity dθp representing only the vehicle body vibration.

During the period in which the wheel speed standard vehicle body vibration (up-and-down bounce speed dZv and pitch angular velocity dθp) is estimated, in step S65 shown in FIG. 16, the driving braking force standard vehicle body vibration estimating unit 25b shown in FIG. 15 reads the requested torque rTd determined by the computing section 21 shown in FIG. 2 as the driving braking torque of the vehicle.

The driving braking force standard vehicle body vibration estimating unit 25b is the same as that shown in FIG. 11, and it has a vehicle model 37. In step S66 shown in FIG. 16, the wheel speed standard vehicle body vibration (up-and-down bounce speed dZv and pitch angular velocity dθp) is taken as the observer input, and the vehicle model 37 is adopted to carry out the state estimation by the observer from the requested torque rTd (the driving braking torque of the vehicle), so that the driving braking force standard vehicle body vibration (up-and-down bounce quantity fZv, up-and-down bounce speed dfZv, pitch angle fθp, pitch angular velocity dfθp) is computed and estimated.

However, if the scheme is executed as is, the precision of estimation is low due to the error in the modeling and the external disturbances (bumps/dips on the road surface).

Here, according to the present embodiment, just as the third embodiment, when the driving braking force standard vehicle body vibration estimating unit 25b shown in FIG. 15 (step S66 in FIG. 16) uses the vehicle model 37 to carry out the state estimation by the observer from the requested torque rTd (driving braking torque of the vehicle), and to compute and estimate the driving braking force standard vehicle body vibration x (up-and-down bounce quantity fZv, up-and-down bounce speed dfZv, pitch angle fθp, pitch angular velocity dfθp):

as shown in FIG. 15, the wheel speed standard vehicle body vibration (up-and-down bounce speed dZv and pitch angular velocity dθp) from the computing parts 55 and 56 [inconsistent key] is also taken as the observer input and it uses the vehicle model 37 to compute the driving braking force standard vehicle body vibration x (up-and-down bounce quantity fZv, up-and-down bounce speed dfZv, pitch angle fθp, pitch angular velocity dfθp) from the requested torque rTd (the driving braking torque of the vehicle).

In this way, the driving braking force standard vehicle body vibration estimating unit 25b shown in FIG. 15 also takes the wheel speed standard vehicle body vibration (up-and-down bounce speed dZv and pitch angular velocity dθp) as the observer input, and, on the basis of vehicle model 37, the driving braking force standard vehicle body vibration x (up-and-down bounce quantity fZv, up-and-down bounce speed dfZv, pitch angle fθp, pitch angular velocity dfθp) is computed from the requested torque rTd (the driving braking torque of the vehicle).

The driving braking force standard vehicle body vibration estimating unit 25b (the vehicle model 37) can meet both the demand on a robust property to external disturbances and the demand on a high stability.

Also, as the driving braking force standard vehicle body vibration x is estimated from the requested torque rTd (the driving braking torque of the vehicle) as the cause of the vehicle body vibration, the driving braking force standard vehicle body vibration x (up-and-down bounce quantity fZv, up-and-down bounce speed dfZv, pitch angle fθp, pitch angular velocity dfθp) before the generation of the vehicle body vibration instead of after the generation of the vehicle body vibration is taken as the final vehicle body vibration, and it is possible to make the feed forward estimation.

In step S67 shown in FIG. 16, the driving braking torque correction quantity computing section 26 shown in FIG. 15 computes the driving braking torque correction quantity ΔTd needed for suppressing the driving braking force standard vehicle body vibration x (up-and-down bounce quantity fZv, up-and-down bounce speed dfZv, pitch angle fθp, pitch angular velocity dfθp) as the final vehicle body vibration as follows.

That is, the driving braking force standard vehicle body vibration x (up-and-down bounce quantity fZv, up-and-down bounce speed dfZv, pitch angle fθp, pitch angular velocity dfθp) is multiplied by the regulator gain Kr (set similarly as in the third embodiment) indicated by key "38" in FIG. 15, and the linear sum of the product values obtained as the results is taken as the driving braking torque correction quantity ΔTd.

The driving braking torque correction quantity ΔTd determined by the driving braking torque correction quantity computing section 26 shown in FIG. 15 (step S67 shown in FIG. 16) is sent to the adder 24 shown in FIG. 2.

The adder 24 corrects the requested torque rTd requested by the driver determined as explained above by the computing section 21 by a quantity corresponding to the driving braking torque correction quantity ΔTd, and, while suppressing the vehicle body vibration, it determines the target torque tTd that can meet the demand of the driver.

The motor torque instruction value computing section 23 shown in FIG. 2 limits or adjusts the target torque tTd to meet the request for torque from another system 27, and determines the final motor torque instruction value tTm for realizing this objective, with the result being adopted in the control of driving of the motor 4 via the inverter 8.

<Effects>

As explained above, in the vehicle body vibration suppressing control in this embodiment, also, for the motor 4, driving control is carried out to suppress the driving braking force standard vehicle body vibration x (up-and-down bounce quantity fZv, up-and-down bounce speed dfZv, pitch angle fθp, pitch angular velocity dfθp) while meeting the requested torque rTd requested by the driver.

Due to suppression of the driving braking force standard vehicle body vibration x (up-and-down bounce quantity fZv, up-and-down bounce speed dfZv, pitch angle fθp, pitch angular velocity dfθp), of course, the comfort of riding in the vehicle can be improved; it is also possible improve the steering stability since it is possible to have a stable vehicle body posture when the vehicle turns.

In addition, according to this embodiment, when the driving braking force standard vehicle body vibration x (up-and-down bounce quantity fZv, up-and-down bounce speed dfZv, pitch angle fθp, pitch angular velocity dfθp) is estimated for the vehicle body vibration suppressing control:

on the basis of the prescribed correlation relationship (suspension geometry characteristics) shown as example in FIGS. 6 and 7 between the displacements in the back-and-forth direction Xtf and Xtr and the up-and-down displacements Zf and Zr of the left/right front wheels 1FL and 1FR and left/right rear wheels 1RL and 1RR with respect to the vehicle body 3, the wheel speed standard vehicle body vibration (up-and-down bounce speed aZv and pitch angular velocity aθp) are estimated from the average front wheel speed VwF and average rear wheel speed VwR.

From the estimation result of aZv, aθp, only the component near the resonance frequency of the vehicle body is extracted by the band-pass filter processing sections 55 and 56 (step S64), and the wheel speed standard vehicle body vibration (up-and-down bounce speed dZv and pitch angular velocity dθp) is estimated.

While the wheel speed standard vehicle body vibration (up-and-down bounce speed dZv and pitch angular velocity MO is taken as the observer input, from the requested torque rTd (the driving braking force of the vehicle), the vehicle model 37 is adopted to determine the driving braking force standard vehicle body vibration x (up-and-down bounce quantity fZv, up-and-down bounce speed dfZv, pitch angle fθp, pitch angular velocity dfθp) as the final vehicle speed. As a result, the following effects can be realized.

That is, without adding the suspension stroke sensor as would be needed in the prior art, it is possible to estimate the final driving braking force standard vehicle body vibration x (up-and-down bounce quantity fZv, up-and-down bounce speed dfZv, pitch angle fθp, pitch angular velocity dfθp), and this is favorable in terms of cost.

In addition, without using the torques and forces, such as the spring constant, vehicle mass, etc., that vary corresponding to degradation over time and the increase/decrease in the number of the occupants riding in the vehicle, from the average front wheel speed VwF and the average rear wheel speed VwR, the wheel speed standard vehicle body vibration (up-and-down bounce speed dZv and pitch angular velocity dθp) is estimated from the information related to the wheel speed, so that the estimation precision is high.

In addition, while the high-precision wheel speed standard vehicle body vibration (up-and-down bounce speed dZv and pitch angular velocity dip) is taken as the observer input, from the requested torque rTd (the driving braking force of the vehicle), the vehicle model 37 is adopted to estimate the driving braking force standard vehicle body vibration x (up-and-down bounce quantity fZv, up-and-down bounce speed dfZv, pitch angle fθp, pitch angular velocity dfθp).

Consequently, the driving braking force standard vehicle body vibration (the final vehicle speed) x can be obtained with an excellent robust property with respect to the external disturbances and with a high precision, and the effects of the vibration suppressing control are excellent.

In addition, the wheel speed standard vehicle body vibration (up-and-down bounce speed dZv and pitch angular velocity dθp) is not taken as the final vehicle speed as it is. Instead, it is taken as the observer input, with the vehicle model 37 being adopted to estimate the driving braking force standard vehicle body vibration x (up-and-down bounce quantity fZv, up-and-down bounce speed dfZv, pitch angle fθp, pitch angular velocity dfθp) from the driving braking force rTd of the vehicle before generation of the vehicle body vibration. Consequently, even when the vehicle body vibration suppressing control is carried out as feed forward control, there is still no delay in the estimation of the vehicle body vibration; there is also no problem that would hamper realization of the vehicle body vibration suppressing control.

<Modified Forms of the Third and Fourth Embodiments>

In the above explanation of the vehicle body vibration estimating devices in the third and fourth embodiments, the motor 4 alone is taken as the power source for the electric automobile, for which the vehicle body vibration suppressing control is carried out by the driving braking force operation.

However, the scheme can also be adopted in the vehicle body vibration suppressing controller via engine control of a vehicle containing an internal combustion engine or other engine as the power source, and the scheme can also be adopted in the vehicle body vibration suppressing controller via the operation of a suspension device instead of the driving braking force operation of a motor or an engine.

Also, the wheel speed information adopted in estimating the vehicle body vibration is not limited to the average front wheel speed VwF and average rear wheel speed VwR as shown in the drawing; it may also be adopted in estimating the vehicle body vibration on the basis of a 4-wheel model where the wheel speeds VwFL and VwFR, VwRL and VwRR are individually adopted.

In this case, the wheel speed standard vehicle body vibration as the observer input to the vehicle model 37 is not limited to the pitch angular velocity $d\theta p$ and up-and-down bounce speed $dZv$ in the third and fourth embodiments. It is also easy to estimate the roll movement and other vibrations of the vehicle body.

In the third embodiment, when the frequency component indicating the vehicle body vibration (the back-and-forth movement component of the wheels with respect to the vehicle body 3) is fetched from the average front wheel speed VwF and the average rear wheel speed VwR, a band-pass filter extracting only the component near the resonance frequency of the vehicle body from the average front wheel speed VwF and the average rear wheel speed VwR is adopted to obtain the vibration component fVwF near the vehicle body resonance frequency of the average front wheel speed VwF and the vibration component fVwR near the vehicle body resonance frequency of the average rear wheel speed VwR, which are adopted in estimating the wheel speed standard vehicle body vibration (pitch angular velocity $d\theta p$ and up-and-down bounce speed $dZv$). However, instead of the information data, it is also possible to use the following wheel speed information.

That is, the following scheme may also be adopted: a means for accurately detecting or estimating the vehicle speed as the speed of the vehicle body 3 with respect to the ground is arranged; the errors between the vehicle speed and the average front wheel speed VwF and the average rear wheel speed VwR are adopted instead of the vibration component fVwF near the vehicle body resonance frequency of the average front wheel speed VwF and the vibration component fVwR near the vehicle body resonance frequency of the average rear wheel speed VwR in estimating the wheel speed standard vehicle body vibration (pitch angular velocity $d\theta p$ and up-and-down bounce speed $dZv$).

Here, in consideration of the slip rate difference between the driving wheels and the driven wheels, etc., this scheme is unfavorable with respect to the precision in estimating the vehicle body vibration, so it is practical to use the scheme whereby the vibration component fVwF near the vehicle body resonance frequency of the average front wheel speed VwF and the vibration component fVwR near the vehicle body resonance frequency of the average rear wheel speed VwR obtained using the band-pass filter as that in the third embodiment are adopted.

In the fourth embodiment, using the band-pass filter process, from the up-and-down bounce speed aZv and the pitch angular velocity $a\theta p$ of the vehicle body 3 directly determined from the average front wheel speed VwF and the average rear wheel speed VwR, only the component near the resonance frequency of the vehicle body is taken out as the wheel speed standard vehicle body vibration (pitch angular velocity $d\theta p$ and up-and-down bounce speed $dZv$) that represents only the vehicle body vibration.

However, instead of the scheme, one may also adopt a scheme in which the filtering process is carried out to remove the drift component from the up-and-down bounce speed aZv and the pitch angular velocity $a\theta p$, or in which a filtering process is carried out to remove the low frequency component lower than the frequency component near the resonance frequency of the vehicle body, to obtain the wheel speed standard vehicle body vibration (pitch angular velocity $d\theta p$ and up-and-down bounce speed $dZv$).

In both the third and fourth embodiments, the requested torque rTd determined by the computing section 21 in FIG. 2 is adopted as the driving braking force for estimating the driving braking force standard vehicle body vibration x (up-and-down bounce quantity fZv, up-and-down bounce speed dfZv, pitch angle $f\theta p$, pitch angular velocity $df\theta p$). However, the present invention is not limited to the scheme. Any state quantity that can represent the driving braking force of the vehicle may be adopted as well.

In addition, when the vehicle has an actuator that automatically adjusts the driving braking force, the requested torque of the vehicle body is computed from the operation of the actuator and, of course, the obtained requested torque can be used as the driving braking force of the vehicle.

Fifth Embodiment

<Configuration>

Figure 17:
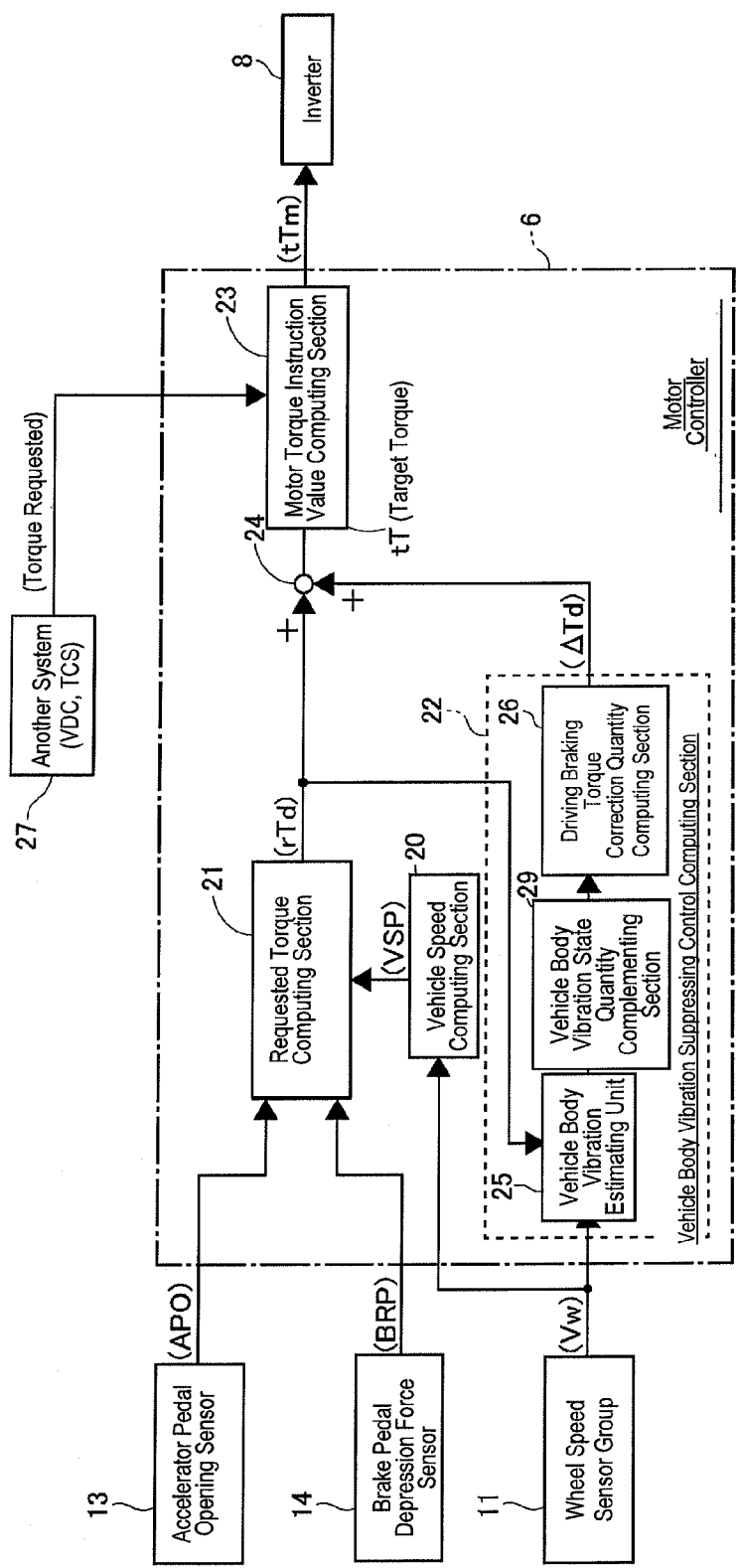
FIG. 17 is a block diagram illustrating the functions of the motor controller corresponding to FIG. 2. It shows the vehicle body vibration estimating device and the vehicle body vibration suppressing controller in the fifth embodiment of the present invention.

FIG. 17 shows the vehicle body vibration estimating device and the vehicle body vibration suppressing controller related to the fifth embodiment of the present invention. It is a block diagram illustrating the functions of the motor controller 6 corresponding to FIG. 2.

Figure 18:
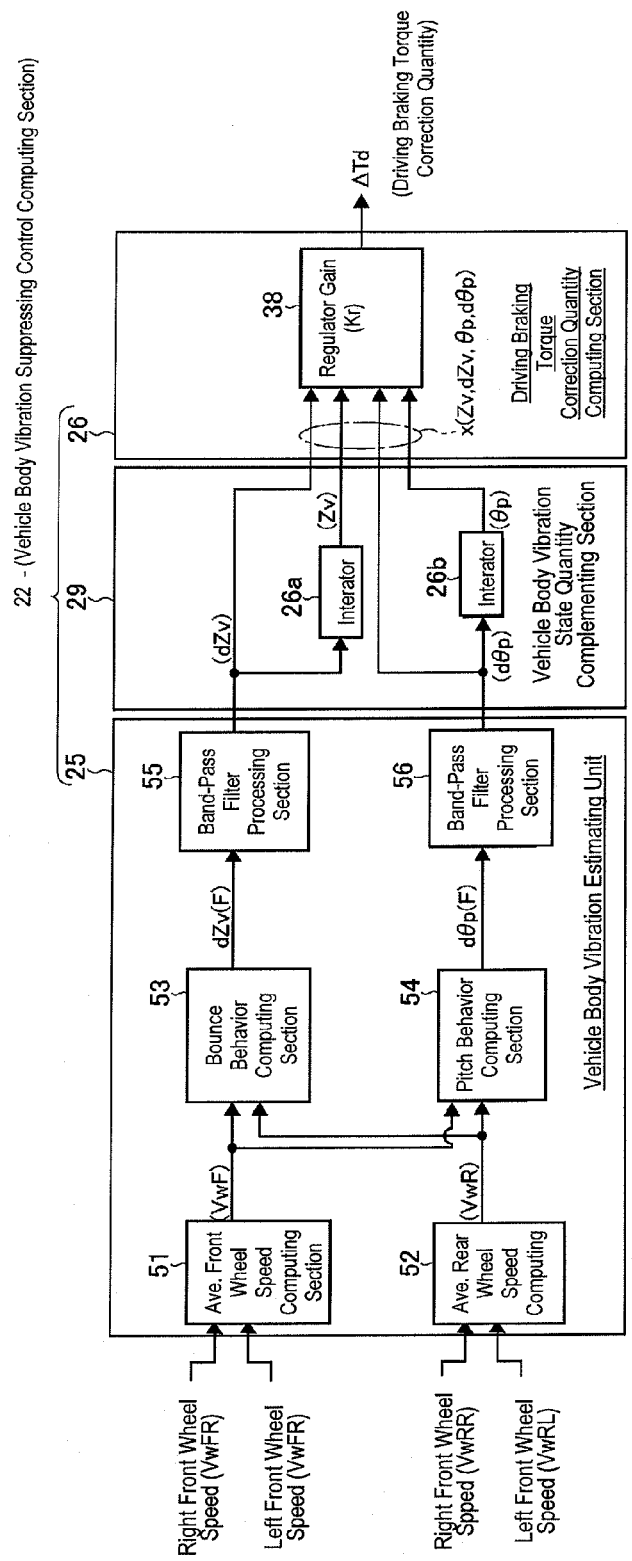
FIG. 18 is a block diagram illustrating the functions of the vehicle body vibration suppressing control computing section shown in FIG. 17.

FIG. 18 is a diagram illustrating in detail the vehicle body vibration suppressing control computing section 22 shown in FIG. 17. It is a block diagram illustrating the functions corresponding to FIG. 3.

Figure 19:
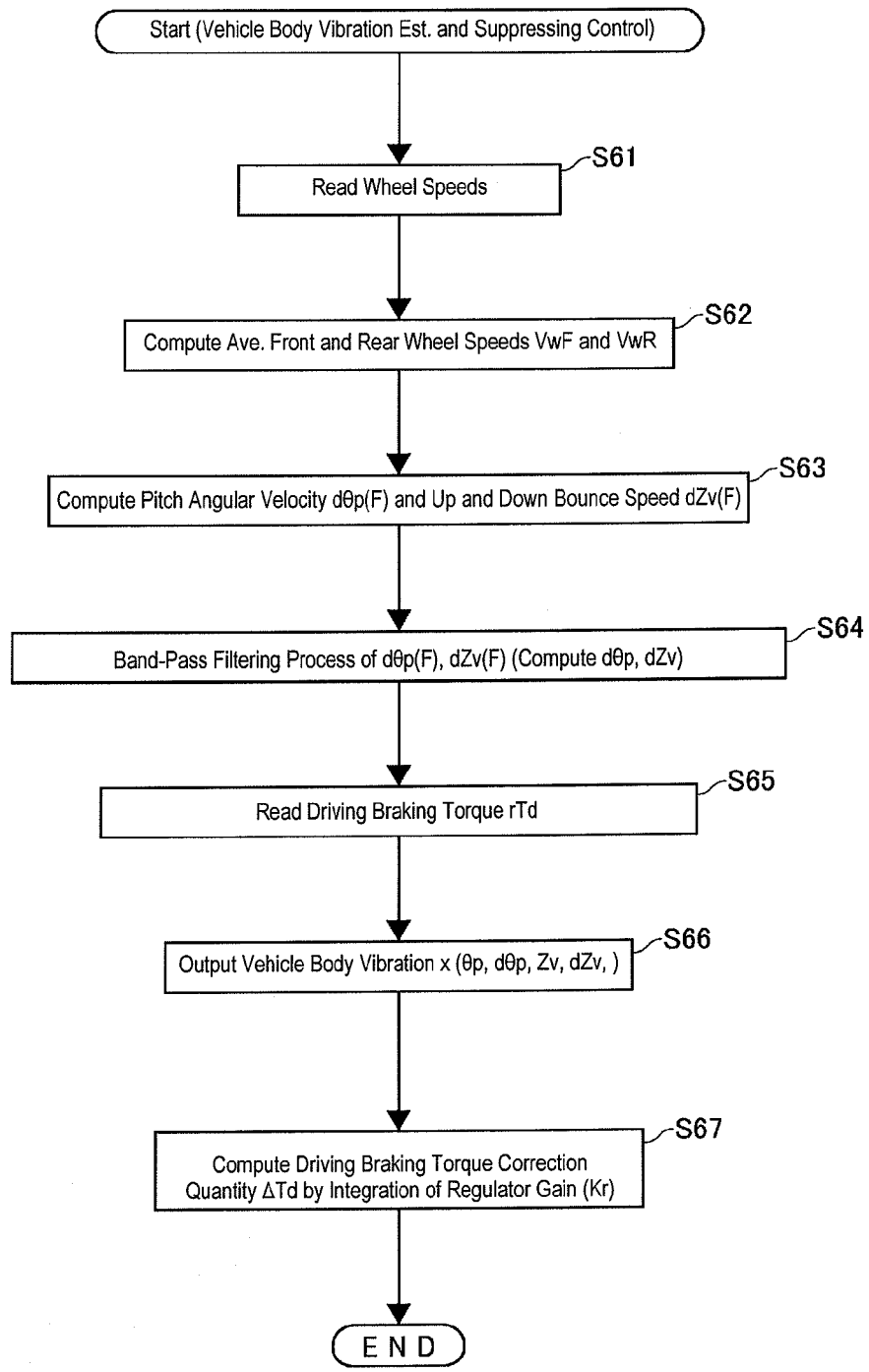
FIG. 19 is a flow chart illustrating the control program executed by the vehicle body vibration estimating section, the vehicle body vibration state quantity complementing section and the driving braking torque correction quantity computing section shown in FIGS. 17 and 18 for estimating the vehicle body vibration and, at the same time, for computing the torque correction quantity for suppressing the vehicle body vibration.

FIG. 19 is a flow chart illustrating the control program executed by the vehicle body vibration suppressing control computing section 22 shown in FIGS. 17 and 18 to estimate the vehicle body vibration and, at the same time, to compute the torque correction quantity for suppressing the vehicle body vibration.

The vehicle body vibration suppressing system is the same as that shown in FIG. 1. Consequently, explanation of the vehicle body vibration suppressing control system on the basis of this figure will not be repeated. In the following, only the features different from the first embodiment will be explained with reference to FIGS. 17 to 19.

The motor controller 6 estimates the vibration of the vehicle body 3, and, at the same time, it corrects the requested torque rTd requested by the driver to determine the motor torque instruction value tTm so as to suppress the estimated vibration of the vehicle body 3. Consequently, in addition to input of the accelerator pedal openness APO and the brake pedal stepping force BRP, the following physical quantities representing the vehicle body vibration are also input: left/right front wheel speeds VwFL and VwFR (front wheel physical quantities) as the circumferential velocities of the left/right front wheels 1FL and 1FR, and the left/right rear wheel speeds VwRL and VwRR (rear wheel physical quantities) as the circumferential velocities of the left/right rear wheels 1RL and 1RR.

However, the physical quantities representing the vehicle body vibration are not limited to the physical quantities. One may also use the rotation velocity at any site rotating together with the left/right front wheels 1FL and 1FR and the left/right rear wheels 1RL and 1RR, and one may also use another speed information as well.

Consequently, the wheel speeds VwFL and VwFR, VwRL and VwRR correspond to the vehicle body vibration physical quantities in the present invention. The wheel speed sensors 11FL and 11FR, 11RL and 11RR form the vehicle body vibration physical quantity detecting means in this invention.

As shown in FIG. 17, similar to that shown in FIG. 2, the motor controller 6 consists of a vehicle speed computing section 20, a requested torque computing section 21, a vehicle body vibration suppressing control computing section 22, a motor torque instruction value computing section 23, and an adder 24.

Also, a vehicle body vibration state quantity complementing section 29 is included between the vehicle body vibration estimating unit 25 and the driving braking torque correction quantity computing section 26 in the vehicle body vibration suppressing control computing section 22. The vehicle body vibration suppressing control computing section 22 consists of the vehicle body vibration estimating unit 25, the driving braking torque correction quantity computing section 26, and the vehicle body vibration state quantity complementing section 29.

The vehicle speed computing section 20 determines the vehicle speed VSP from the left/right front wheel speeds VwFL and VwFR and the left/right rear wheel speeds VwRL and VwRR (indicated by wheel speed Vw in FIG. 17,) detected by the wheel speed sensors 11FL and 11FR, 11RL and 11RR (indicated by wheel speed sensor group 11 in FIG. 17).

By means of map retrieval or another computing operation, the requested torque computing section 21 determines the requested torque rTd (if positive, it represents a driving torque; if negative, it represents a braking torque) requested in the manipulation by the driver for driving on the basis of the current vehicle speed VSP obtained by the computing unit 20 mentioned above (accelerator pedal openness APO and brake pedal stepping force BRP) from the accelerator pedal openness APO and the brake pedal stepping force BRP detected by the sensors 13, 14.

Among the vehicle body vibration estimating unit 25, the vehicle body vibration state quantity complementing section 29 and the driving braking torque correction quantity computing section 26 that form the vehicle body vibration suppressing control computing section 22:

the vehicle body vibration estimating unit 25 estimates the vibration of the vehicle body 3 (or the vehicle body vibration state quantity) to be explained in detail later from the wheel speed Vw, and the vehicle body vibration state quantity complementing section 29 computes the other vehicle body vibration (another vehicle body vibration state quantity) from the vehicle body vibration (or the vehicle body vibration state quantity) estimated by the vehicle body vibration estimating unit 25.

Consequently, the vehicle body vibration estimating unit 25 corresponds to the vehicle body vibration state quantity computing means, and the vehicle body vibration state quantity complementing section 29 corresponds to the vehicle body vibration state quantity complementing means in this invention.

The vehicle body vibration state quantity complementing section 29 feeds the computed another vehicle body vibration (another vehicle body vibration state quantity) together with the vehicle body vibration (or vehicle body vibration state quantity) from the vehicle body vibration estimating unit 25 to the driving braking torque correction quantity computing section 26.

The driving braking torque correction quantity computing section 26 computes the driving braking torque correction quantity ΔTd needed for suppressing the vehicle body vibration (or the vehicle body vibration state quantity) fed from the vehicle body vibration estimating unit 25 via the vehicle body vibration state quantity complementing section 29, and the other vehicle body vibration (another vehicle body vibration state quantity) from the vehicle body vibration state quantity complementing section 29.

Consequently, the driving braking torque correction quantity computing section 26 corresponds to the driving braking force correction quantity computing means in the present invention.

The adder 24 corrects the requested torque rTd requested by the driver determined by the requested torque computing section 21 by adding the driving braking torque correction quantity ΔTd determined by the driving braking torque correction quantity computing section 26 to it, so that it can determine the target torque tTd that meets the request of the driver while suppressing the vehicle body vibration.

Consequently, the adder 24 forms the driving braking force correcting means according to the present invention.

The motor torque instruction value computing section 23 receives the torque request from another system 27, such as the behavior controller (VDC) that controls the behavior of the vehicle or the traction controller (TCS) for preventing slip in driving of the driving wheels (the front wheels) 1FL and 1FR or the like, and it limits or adjusts the target torque tTd to meet the request, so that the final motor torque instruction value tTm for realizing the operation is determined.

Corresponding to the motor torque instruction value tTm determined as mentioned previously, the motor controller 6 has the electric power fed from the valve 7 to the motor 4 under control of the inverter 8, so that the motor 4 is driven under control to ensure that the torque of the motor 4 is in agreement with the motor torque instruction value tTm.

<Vehicle Body Vibration Estimation and Vehicle Body Vibration Suppressing Control>

The vehicle body vibration estimating unit 25, the vehicle body vibration state quantity complementing section 29, and the driving braking torque correction quantity computing section 26 inside the vehicle body vibration suppressing control computing section 22 have the configuration shown in the block diagram in FIG. 18. The vehicle body vibration suppressing control computing section executes the control program shown in FIG. 19 to estimate the vibration of the vehicle body 3 (in this application example, the pitching movement $\theta p$, the pitch angular velocity $d\theta p$, the up-and-down bounce movement $Zv$, and the up-and-down bounce speed $dZv$), and, at the same time, it computes the driving braking torque correction quantity $\Delta Td$ needed for suppressing the estimated vehicle body vibration ($\theta p$, $d\theta p$, $Zv$, $dZv$).

As shown clearly in FIG. 18, the vehicle body vibration estimating unit 25 consists of the average front wheel speed computing section 51, the average rear wheel speed computing section 52, the bounce behavior computing section 53, the pitching behavior computing section 54, and the band-pass filter processing sections 55 and 56.

First of all, in step S61 shown in FIG. 19, as shown in FIG. 18, the average front wheel speed computing section 51 and the average rear wheel speed computing section 52 read the left/right front wheel speeds VwFL and VwFR and the left/right rear wheel speeds VwRL and VwRR.

As shown in FIG. 18, the average front wheel speed computing section 51 and the average rear wheel speed computing section 52 (step S62 shown in FIG. 19) compute the average front wheel speed VwF=(VwFL+VwFR)/2 from the left/right front wheel speeds VwFL and VwFR, and, at the same time, the average rear wheel speed VwR=(VwRL+VwRR)/2 from the left/right rear wheel speeds VwRL and VwRR.

As shown in FIG. 18, the method for the bounce behavior computing section 53 and the pitching behavior computing section 54 (step S63 in FIG. 19) to determine the up-and-down bounce speed dZv(F) and the pitch angular velocity dθp(F) of the vehicle body 3 as the vehicle body vibration state quantity from the average front wheel speed VwF and the average rear wheel speed VwR is the same as the method shown in FIGS. 5 to 7.

That is, from the average front wheel speed VwF and the average rear wheel speed VwR determined in the above, the computing sections 51 and 52 shown in FIG. 18 (step S62 shown in FIG. 19) determines the displacements Xtf in the back-and-forth direction of the left/right front wheels 1FL and 1FR and the displacements in the back-and-forth direction Xtr of the left/right rear wheels 1RL and 1RR including the vehicle body vibration.

These time differential values dXtf and dXtr of the displacements in the back-and-forth direction Xtf and Xtr are substituted to the equations (7) and (8) to compute and estimate the up-and-down bounce speed dZv(F) and the pitch angular velocity dθp(F) as the vehicle body vibration state quantities, respectively.

Next, in the band-pass filter processing section 55 shown in FIG. 18 (step S64 shown in FIG. 19), only the component near the resonance frequency of the vehicle body is extracted from the up-and-down bounce speed dZv(F) of the vehicle body 3 determined by the bounce behavior computing section 53 of FIG. 18 (step S63 shown in FIG. 19). Here, only the component of the up-and-down bounce speed dZv(F) passes through the band-pass filter, so that it is possible to determine the up-and-down bounce speed dZv(F) as the component of vibration of the up-and-down bounce speed dZv (or the vehicle body state quantity) near the resonance frequency of the vehicle body.

The reason for extracting only the component near the resonance frequency of the vehicle body by filtering process for the up-and-down bounce speed dZv(F) of the vehicle body 3 is as follows: the up-and-down bounce speed dZv(F) originally contains the variation in the wheel speed caused by acceleration/deceleration of the entirety of the vehicle and the noise components. It is thus necessary to remove these components from the up-and-down bounce speed dZv(F) to obtain the final up-and-down bounce speed dZv representing only the vehicle body vibration.

In addition, in the band-pass filter processing section 56 shown in FIG. 18 (step S64 shown in FIG. 19), only the component near the resonance frequency of the vehicle body is extracted from the pitch angular velocity dθp(F) of the vehicle body 3 determined by the pitching behavior computing section 54 of FIG. 18 (step S63 shown in FIG. 19). Here, only the component of the pitch angular velocity dθp(F) passes through the band-pass filter, so that it is possible to determine the pitch angular velocity dθp(F) as the component of pitch angular velocity dθp (or the vehicle body state quantity) near the resonance frequency of the vehicle body.

The reason for extracting only the component near the resonance frequency of the vehicle body by a filtering process for the pitch angular velocity dθp(F) of the vehicle body 3 is as follows: the pitch angular velocity dθp(F) originally contains the variation in the wheel speed caused by acceleration/deceleration of the entirety of the vehicle and the noise components. It is thus necessary to remove these components from the pitch angular velocity dθp(F) to obtain the final up-and-down bounce speed pitch angular velocity dθp representing only the vehicle body vibration.

Here, as far as the vehicle body vibration suppressing control for suppressing the vehicle body vibration is concerned, it is preferred that the driving braking torque correction quantity for the vehicle body vibration suppression be multiplied with the gain with respect to the vehicle body vibration, and it is thus necessary to set the gain for suppressing the vehicle body vibration.

Figure 20:
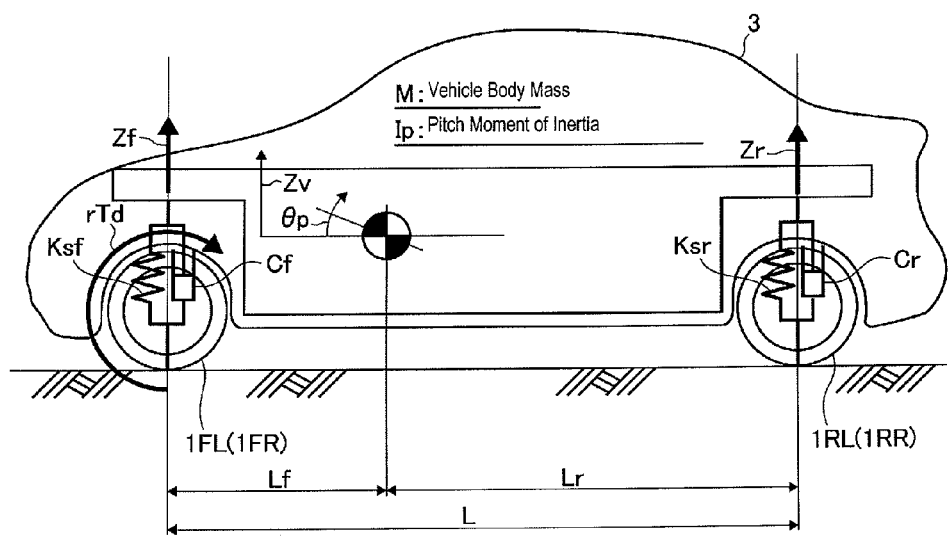
FIG. 20 is a diagram illustrating the movement model of the vehicle.

For this reason, the vehicle model shown in FIG. 20 is used, the drawing of which mechanically summarizes the relationship between the driving braking torque and the vehicle body vibration of the vehicle.

FIG. 20 is a diagram illustrating the vehicle model 37. Just as described in the case shown in FIG. 5, suppose Lf represents the distance between the center of gravity and the front axle in the wheel base L, while Lr represents the distance of the center of gravity and the rear axle, Ksf and Cf represent the spring constant and vibration-damping coefficient of the front wheel suspension device, respectively, Ksr and Cr represent the spring constant and the vibration-damping coefficient of the rear wheel suspension device, respectively, M represents the mass of the vehicle body 3, and Ip represents the pitching inertial moment of the vehicle body 3, when the requested torque rTd determined by the requested torque computing section 21 shown in FIG. 17 is applied as the driving braking torque on the left/right front wheels 1FL and 1FR;

the up-and-down bounce quantity Zv and the pitch angle θp at the center of gravity of the vehicle body 3 are shown together with the up-and-down displacements Zf at the site above the front axle of the vehicle body 3 and the up-and-down displacements Zr at the site above the rear axle of the vehicle body 3.

In the vehicle model shown in FIG. 20, the motion equations related to the up-and-down bounce quantity Zv and the pitch angle θp can be represented as follows, with the differential operator simply represented as "d".

$$M \cdot ddfZv = -2Ksf(Zv+Lf \cdot \theta p) - 2Cf(dZv+Lf \cdot df\theta p) - 2Ksr \\ (Zv-Lr \cdot \theta p) - 2Cr(dZv-Lr \cdot d\theta p) \quad (11)$$

$$Ip \cdot dd f\theta p = -2Lf\{Ksf(Zv+Lf \cdot \theta p) + Cf(dZv+Lf \cdot d\theta p)\} + \\ 2Lr\{Ksr(Zv-Lr \cdot \theta p) + Cr(dZv-Lr \cdot d\theta p)\} + rTd \quad (12)$$

These motion equations are converted to state equations, and the driving braking torque rTd is taken as the input in computing and estimating the pitching movement (pitch angle θp and pitch angular velocity dfθp) of the vehicle body 3 and the up-and-down bounce movement (up-and-down bounce quantity Zv and up-and-down bounce speed dZv).

Consequently, weighting is carried out on these four types of vehicle body vibration state quantities (θp, dθp, Zv, dZv), and, on the basis of the weighting, the regulator gain for suppressing the vehicle body vibration state quantities (θp, dθp, Zv, dZv) is designed and adopted in the vehicle body vibration suppressing control.

However, at the vehicle body vibration estimating unit 25 of FIGS. 17 and 18, among the four types of vehicle body vibration state quantities (pitch angle θp, pitch angular velocity dθp, up-and-down bounce quantity Zv, and up-and-down bounce velocity dZv), only two types, that is, the pitch angular velocity dθp and the up-and-down bounce speed dZv (or the vehicle body vibration state quantity) can be estimated, while for the other types, that is, the pitch angle θp and the up-and-down bounce quantity Zv, there is no way to make vibration suppressing control to actively suppress them.

According to the present embodiment, the vehicle body vibration state quantity complementing section 29 shown in FIG. 18 (step S65 in FIG. 19) can determine the pitch angle θp and the up-and-down bounce quantity Zv as the other vehicle body vibration state quantities from the pitch angular velocity dθp and the up-and-down bounce speed dZv, so that the complemented vehicle body vibration state quantity complementing process is carried out.

For this purpose, in the vehicle body vibration state quantity complementing section 29 shown in FIG. 18, integrators 26a and 26b are provided. Here, the integrator 26a integrates the up-and-down bounce speed dZv to obtain the up-and-down bounce quantity Zv, and the integrator 26b integrates the pitch angular velocity dθp to obtain the pitch angle θp.

As shown in FIG. 18, the vehicle body vibration state quantity complementing section 29 works as follows in step S66 shown in FIG. 19. That is, the up-and-down bounce speed dZv and the pitch angular velocity dθp from the vehicle body vibration estimating unit 25 are sent as it is to the driving braking torque correction quantity computing section 26, and the up-and-down bounce quantity Zv and pitch angle θp determined by integrating them are sent to the driving braking torque correction quantity computing section 26, too. That is, the four types of the vehicle body vibration x (θp, dθp, Zv, dZv) are sent to the driving braking torque correction quantity computing section 26.

In step S67 shown in FIG. 19, the driving braking torque correction quantity computing section 26 shown in FIG. 18 computes the driving braking torque correction quantity ΔTd needed for suppressing the four types of vehicle body vibration x (θp, dθp, Zv, dZv).

Here, the vehicle body vibration x (up-and-down bounce quantity Zv, up-and-down dZv, pitch angle θp, pitch angular velocity dθp) is multiplied with the regulator gain Kr indicated by key 38 in FIG. 18, and the linear sum of the product values obtained as the results is taken as the driving braking torque correction quantity ΔTd.

In this case, the regulator gain Kr is defined as the weight applied for adjusting the degree in suppressing (alleviating) the up-and-down bounce quantity Zv, the up-and-down bounce speed dZv, the pitch angle θp and the pitch angular velocity dθp. This is preferred as it can increase the degree of freedom in the design.

In addition, the regulator gain Kr may be composed of multiple regulator gains that are set by changing the weighting pattern of the suppression (alleviating) degree for each set of the vehicle body vibration, that is, for each of the up-and-down bounce quantity Zv, up-and-down bounce speed dZv, pitch angle θp, and pitch angular velocity dθp.

The sum of the products between the multiple regulator gains and the up-and-down bounce quantity Zv, up-and-down bounce speed dZv, pitch angle θp, and pitch angular velocity dθp may be taken as the driving braking torque correction quantity ΔTd.

The driving braking torque correction quantity computing section 26 shown in FIG. 18 (step S67 shown in FIG. 19) sends the driving braking torque correction quantity ΔTd determined above to the adder 24 shown in FIG. 7.

The adder 24 corrects the requested torque rTd requested by the driver determined by the requested torque computing section 21 by a quantity corresponding to the driving braking torque correction quantity ΔTd to determine the target torque tTd that can meet the request of the driver while suppressing the vehicle body vibration.

The motor torque instruction value computing section 23 shown in FIG. 17 limits or adjusts the target torque tTd to meet the request for the torque by another system 27 to determine the final motor torque instruction value tTm for realizing this operation, and the result is sent via the inverter 8 for controlling driving of the motor 4.

Figure 21:
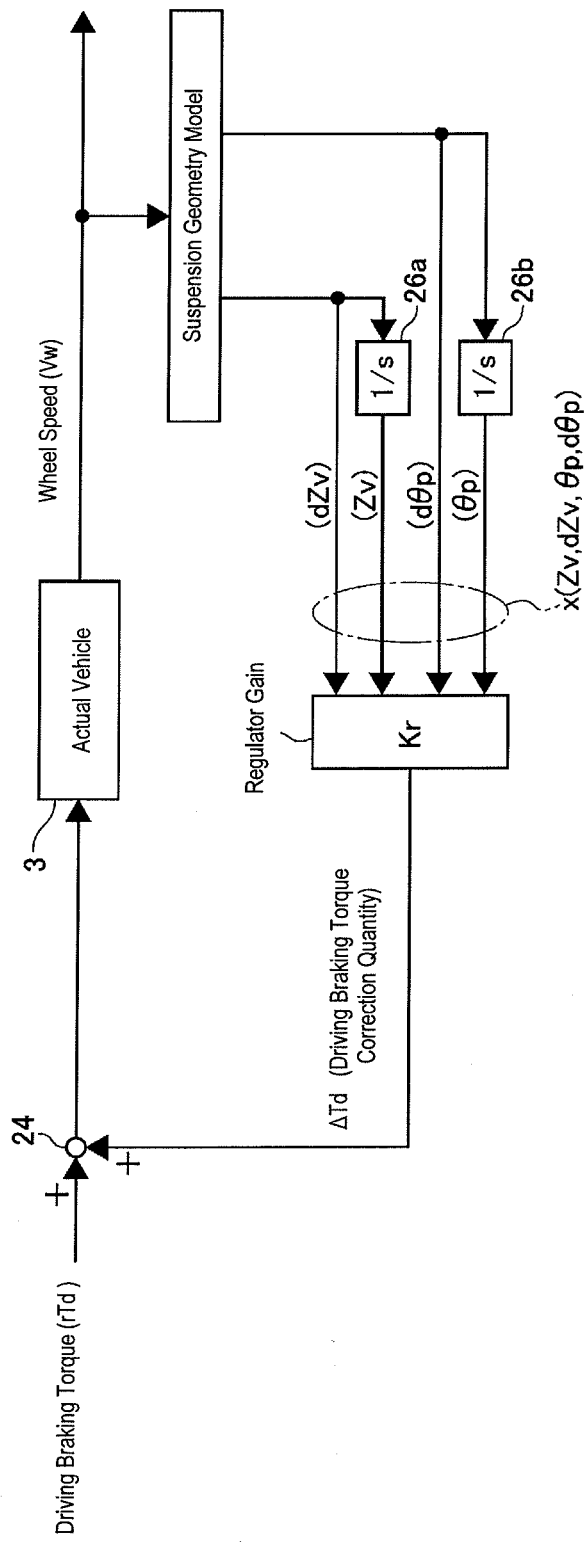
FIG. 21 is a schematic system diagram illustrating the vehicle body vibration estimating process and the vehicle body vibration suppressing control process in the fifth embodiment shown in FIGS. 17 to 19.

FIG. 21 is a diagram illustrating the flow of the operation in estimating the vehicle body vibration and control of the vehicle body vibration in this embodiment as explained above.

When the vehicle body vibration state quantity complementing section 29 shown in FIG. 18 (step S65 shown in FIG. 19) integrates the pitch angular velocity dθp and the up-and-down bounce speed dZv to get the pitch angle θp and the up-and-down bounce quantity Zv, for the conventional integration operation, the operation load is too heavy to be actually adopted, and the computed state quantity is divergent.

In order to adopt in the practical application, one may use the pseudo integrators represented by the following transmission function G(s) by setting the time constant T for the integrators 26a and 26b shown in FIG. 18.

$$G(s)=T/(Ts+1) \quad (13)$$

The signal measured or estimated on an actual vehicle usually has an offset (0 point offset) and noise components. If integration is carried out for such signal without paying attention, the integration error increases, and the control may become divergent.

However, using the pseudo integrators with the preset time constant T, when the pseudo integration is carried out on the basis of the time constant, the old information is kept being deleted, so that it is possible to prevent accumulation in the integration error, and to avoid divergence of the computed state quantity.

In addition, when there is a continuous input for a long time over the time constant T set for the pseudo integration, the integration result may be offset, which is undesirable.

However, in the vehicle body vibration suppressing control system, as the steady component is 0 for the vibration as the control subject (mainly the speed components), even when adopted for a long time, there is still no need to worry that the integration result deviates from the true value.

Here, if the integration time is very short, the influence cannot be ignored. Consequently, it is preferred that the integration time constant T be at least longer than the vehicle body resonance period, and at least the information of the resonance period be able to accumulate it reliably.

Figure 22:
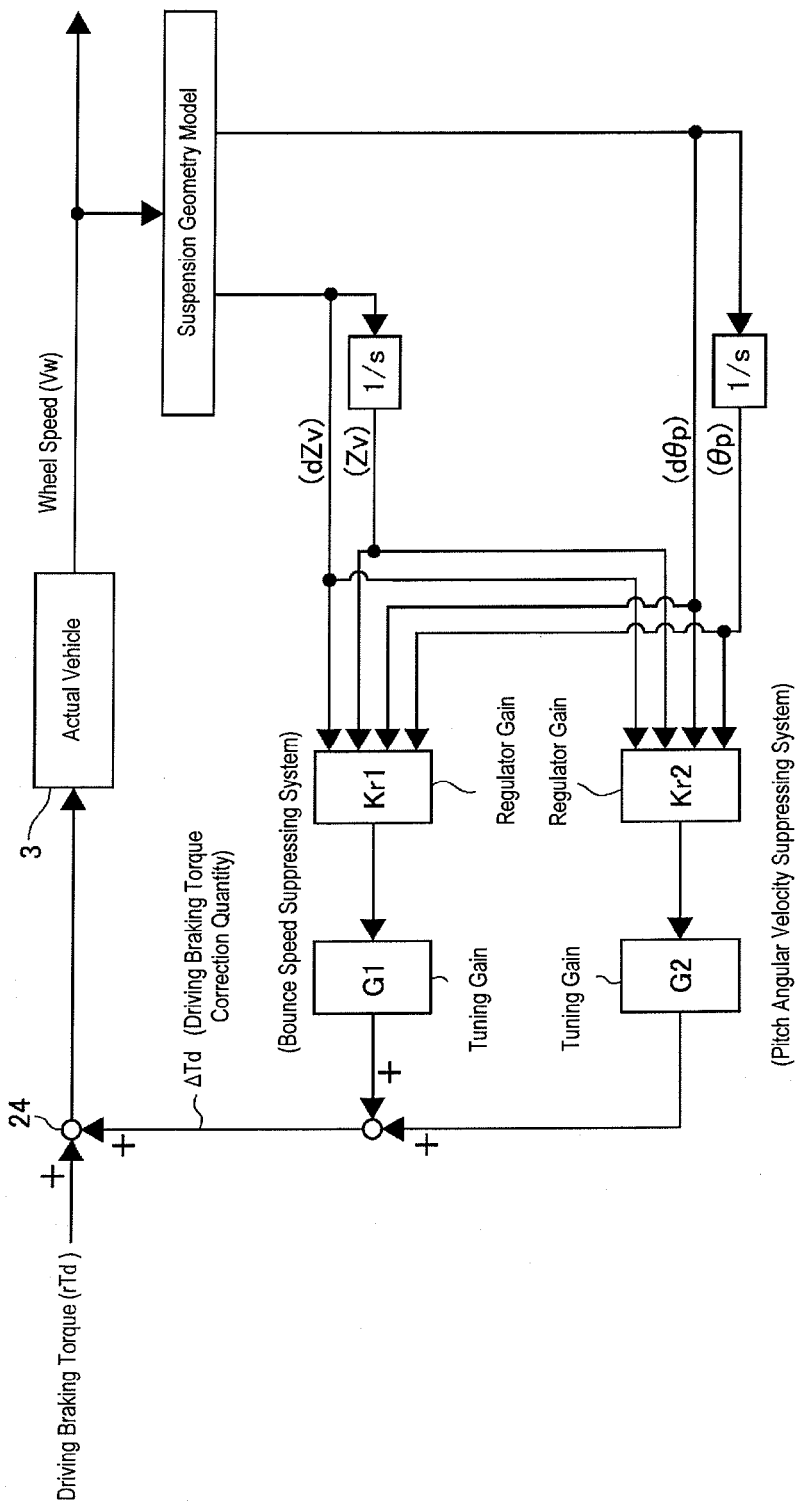
FIG. 22 is a schematic system diagram illustrating the vehicle body vibration estimating process and the vehicle body vibration suppressing control process in a modified example of the vehicle body vibration estimating device and the vehicle body vibration suppressing controller shown in FIGS. 17 to 19.

In addition, one may also adopt the following scheme: when the driving braking torque correction quantity computing section 26 shown in FIG. 18 (step S67 shown in FIG. 19) determines the driving braking torque correction quantity ΔTd for suppressing the vehicle body vibration, as shown in FIG. 22, multiple regulator gains Kr1 and Kr2 are prepared, the tuning gains G1 and G2 are set with respect to the regulator gains Kr1 and Kr2, and the sum of the integration values of the up-and-down bounce quantity Zv, the up-and-down bounce speed dZv, the pitch angle θp, the pitch angular velocity dθp, the multiple regulator gains Kr1 and Kr2, and the tuning gains G1 and G2 is taken as the driving braking torque correction quantity ΔTd.

In this case, there are the following advantages.

That is, when the tuning gains are set for the various vehicle body vibration state quantities, the various vehicle body vibration state quantities also have influences on the other vehicle body vibration state quantities. Consequently, it is difficult to find out the optimum value in hand tuning.

Now, as shown in FIG. 22, multiple regulator gains having a certain degree of balance (such as the gain Kr1 for suppressing the bounce behavior and the gain Kr2 for suppressing the pitching behavior) are prepared and, when tuning is carried out for an actual vehicle, it is possible to apply weighting with the tuning gains G1 and G2 on the regulator gains Kr1 and Kr2, respectively, so that it is possible to efficiently realize the gain tuning.

<Effects>

According to the vehicle body vibration suppressing controller in this embodiment, the motor 4 is controlled in driving to meet the requested torque rTd requested by the driver while suppressing the vehicle body vibration x (up-and-down bounce quantity Zv, up-and-down bounce speed dZv, pitch angle θp, and pitch angular velocity dθp).

Suppression of the vehicle body vibration x (up-and-down bounce quantity Zv, up-and-down bounce speed dZv, pitch angle θp, and pitch angular velocity dθp) can naturally improve the comfort of riding in the vehicle, so it is also possible to realize a stable posture of the vehicle body and to improve the steering stability when the vehicle turns.

However, when the vehicle body vibration suppressing control is carried out, as the vehicle body vibration x, it is necessary to estimate four types, that is, up-and-down bounce quantity Zv, up-and-down bounce speed dZv, pitch angle θp, and pitch angular velocity dθp.

However, the vehicle body vibration estimating unit 25 adopted in the present embodiment estimates the vehicle body vibration from the wheel speeds and other speed information free of variation caused by degradation over time and the increase/decrease in the number of the occupants riding in the vehicle in place of the driving braking force and external disturbance torque that vary corresponding to the degradation over time and increase/decrease in the number of the occupants riding in the vehicle. Consequently, it is only possible to estimate two types of the vehicle body vibration, that is, the up-and-down bounce speed dZv and the pitch angular velocity dθp.

If the result of estimation from the vehicle body vibration estimating unit 25 alone is adopted in the vehicle body vibration suppressing control, it is impossible to realize the prescribed vibration suppressing effect with respect to the up-and-down bounce quantity Zv and the pitch angle θp as the vehicle body vibration other than the up-and-down bounce speed dZv and the pitch angular velocity dθp.

In the vehicle, body vibration estimating device in this embodiment, the vehicle body vibration state quantity complementing section 29 is arranged to complement by determining the up-and-down bounce quantity Zv by integrating the up-and-down bounce speed dZv, and, at the same time, by determining the pitch angle θp by integrating the pitch angular velocity dθp. As a result, the four types of vehicle body vibration of up-and-down bounce speed dZv, the up-and-down bounce quantity Zv, the pitch angular velocity dθp, and the pitch angle θp are adopted in carrying out the vehicle body vibration suppressing control. As a result, it is possible to expect the desired vibration suppressing effect with respect to all of the four types of vehicle body vibration.

The integrators 26a and 26b for integration are pseudo integrators with the prescribed time constant T and having the transmission function G(s) represented by the equation (13).

Consequently, the old information continues to be deleted corresponding to the prescribed time constant T, so that it is possible to prevent accumulation of the integration error and the divergence caused by the accumulation of the integration error; it is also possible to make accurate computing of the up-and-down bounce quantity Zv and the up-and-down bounce quantity Zv.

In addition, when there is an input that lasts for a long time over the time constant T set for the pseudo integration, there is the problem of offset of the integration result. For the vehicle body vibration estimating device of the present embodiment, there is no steady component in the speed information adopted in estimating the vehicle body vibration. Consequently, the troubles can be avoided.

Here, it is impossible to ignore the influence if the time constant T (integration time) is extremely short, and the integration time constant T is selected to be at least longer than the vehicle body resonance period.

Consequently, it is possible to reliably accumulate the information of at least the resonance period, and it is possible to avoid that problem that the up-and-down bounce quantity Zv and the up-and-down bounce quantity Zv cannot be computed due to insufficient information.

In addition, according to the present embodiment, when the up-and-down bounce speed dZv and the pitch angular velocity dθp are estimated by the vehicle body vibration estimating unit 25:

on the basis of the prescribed correlation relationship (suspension geometry characteristics) shown as an example in FIGS. 6 and 7 between the displacements in the back-and-forth direction Xtf and Xtr and the up-and-down displacements Zf and Zr of the left/right front wheels 1FL and 1FR and the left/right rear wheels 1RL and 1RR with respect to the vehicle body 3, the up-and-down bounce speed dZv(F) and pitch angular velocity dθp(F) are estimated from the average front wheel speed VwF and the average rear wheel speed VwR. They are then fed through the band-pass filter processing sections 55 and 56, so that the up-and-down bounce speed dZv and the pitch angular velocity dθp indicating only the vehicle body vibration are extracted. As a result, the following operation and effects can be realized.

That is, because the up-and-down bounce speed dZv and the pitch angular velocity dθp are estimated from the average front wheel speed VwF and the average rear wheel speed VwR without variation caused by the degradation over time and increase/decrease in the number of the occupants riding in the vehicle, it is possible to increase the estimation precision without being influenced by the degradation over time and increase/decrease in the number of the occupants riding in the vehicle, and it is possible to significantly improve the effect of the vibration suppressing control.

According to the present embodiment, as for the integrators 26a and 26b in the vehicle body vibration state quantity complementing section 29 of FIG. 18, the pseudo integrators represented by the transmission function G(s) represented by the equation (13) having the prescribed time constant T set for it is adopted to determine the pitch angle θp and the up-and-down bounce quantity Zv with the pitch angular velocity dθp and the up-and-down bounce speed dZv as the pseudo integrations.

As a result, it is possible to prevent the problem of the conventional integration computing in that the computing load is heavy and there is divergence in the computed pitch angle θp and the up-and-down bounce quantity Zv.

When the pseudo integrators are adopted as in this embodiment, during the pseudo integration on the basis of the time constant T, the old information is kept being deleted, so that it is possible to prevent accumulation of the integration error, and it is possible to avoid the problem of divergence of the computed pitch angle θp and the up-and-down bounce quantity Zv.

In addition, because the integration time constant T is at least over the vehicle body resonance period, at least the information of the resonance period can be accumulated reliably, and it is possible to avoid the problem that due to insufficiency of the information, it is impossible to compute the pitch angle θp and the up-and-down bounce quantity Zv.

In addition, according to the present embodiment, when the driving braking torque correction quantity computing section 26 shown in FIG. 18 determines the driving braking torque correction quantity ΔTd for suppressing the vehicle body vibration, as shown in FIG. 21, the regulator gain Kr is multiplied to the vehicle body vibration x (up-and-down bounce quantity Zv, up-and-down bounce speed dZv, pitch angle θp, and pitch angular velocity dθp) and the linear sum of the product values obtained as a result of the computing is taken as the driving braking torque correction quantity ΔTd.

It is easy to obtain the driving braking torque correction quantity ΔTd, and it is possible to decrease the computing load.

In this case, the regulator gain Kr is determined as the weighting corresponding to the degree in suppressing (alleviating) each of the up-and-down bounce quantity Zv, up-and-down bounce speed dZv, pitch angle θp, and pitch angular velocity dθp.

Consequently, it is possible to improve the degree of freedom in the design; it is also possible to take the balance of the various vibration states by the regulator gain Kr. This is highly favorable in the practical application.

In addition, the same effects can be realized with the following scheme: the regulator gain Kr comprises multiple regulator gains set for variation in the weighting pattern for the degree of suppressing (alleviating) of the up-and-down bounce quantity Zv, up-and-down bounce speed dZv, pitch angle θp, and pitch angular velocity dθp, and the sum of the multiple regulator gains and the integration values of the up-and-down bounce quantity Zv, up-and-down bounce speed dZv, pitch angle θp, and pitch angular velocity dθp is taken as the driving braking torque correction quantity ΔTd.

In addition, when the driving braking torque correction quantity computing section 26 shown in FIG. 18 determines the driving braking torque correction quantity ΔTd for suppressing the vehicle body vibration, as shown in FIG. 22, multiple regulator gains (gain Kr1 for suppressing the bounce behavior, and gain Kr2 for suppressing the pitching behavior) are prepared, the tuning gains G1 and G2 are set with respect to the regulator gains Kr1 and Kr2, and the sum of the integration values of the up-and-down bounce quantity Zv, up-and-down bounce speed dZv, pitch angle θp, and pitch angular velocity dθp, the multiple regulator gains Kr1 and Kr2, and the tuning gains G1 and G2 is taken as the driving braking torque correction quantity ΔTd, during the tuning of an actual vehicle, it is possible to carry out weighting by the tuning gains G1 and G2 for each of the regulator gains Kr1 and Kr2, so that it is possible to realize effective gain tuning.

<Modified Examples of the Fifth Embodiment>

According to the present embodiment, in the above, an explanation has been made on the case in which the vehicle body vibration state quantity complementing section 29 uses the integration of the up-and-down bounce speed dZv and the pitch angular velocity dθp of the vehicle body 3 to determine and complement the up-and-down bounce quantity Zv and the pitch angle θp.

However, one may also adopt the following scheme: when the vehicle body vibration suppressing device is used for suppressing the up-and-down bounce acceleration ddZv and the pitching angular acceleration ddθp, the vehicle body vibration state quantity complementing section 29 has a differentiator, and, by differentiating the up-and-down bounce speed dZv and the pitch angular velocity dθp of the vehicle body 3, it determines the up-and-down bounce acceleration ddZv and the pitching angular acceleration ddθp, which are then adopted in computing the driving braking torque correction quantity ΔTd.

According to the present embodiment, the up-and-down bounce speed dZv and the pitch angular velocity dθp of the vehicle body 3 as well as the up-and-down bounce quantity Zv and the pitch angle θp determined by integrating the quantities are adopted as it is in computing the driving braking torque correction quantity ΔTd.

However, one may also adopt the following scheme: the up-and-down bounce speed dZv, the pitch angular velocity dθp, the up-and-down bounce quantity Zv and the pitch angle θp are subject to a filtering process to remove the steady component or the low frequency component, or they are subject to the filtering process to remove the high frequency component, and the results are adopted in computing the driving braking torque correction quantity ΔTd.

With the filtering process, the noises and offset can be removed from the up-and-down bounce speed dZv, the pitch angular velocity dθp, the up-and-down bounce quantity Zv and the pitch angle θp, so that it is possible to avoid the problem that the noise and offset are further amplified in the later process; thus leading to an adverse influence on the vehicle body vibration suppressing control.

In this embodiment, the pitch angular velocity dθp and the up-and-down bounce speed dZv as the vehicle body vibration state quantities are computed from the average front wheel speed VwF and the average rear wheel speed VwR as the vehicle body vibration physical quantities.

However, one may also adopt the following scheme: a vehicle body vibration state quantity detecting means is arranged for directly or indirectly detecting the pitch angular velocity dθp and the up-and-down bounce speed dZv, with the results detected by this means being taken as the vehicle body vibration state quantities.

In addition, according to the present embodiment, the driving braking torque correction quantity computing section 26 multiplies the regulator gain Kr (Kr1 and Kr2) to the vehicle body vibration x (up-and-down bounce speed dZv, pitch angular velocity dθp, up-and-down bounce quantity Zv and pitch angle θp) to determine the driving braking torque correction quantity. However, the present invention is not limited to the scheme.

One may also adopt the following scheme: the vehicle body vibration x (up-and-down bounce speed dZv, pitch angular velocity dθp, up-and-down bounce quantity Zv and pitch angle θp) is converted to the up-and-down movement physical quantities at any two points (such as the site above the front axle and the site above the rear axle) on the vehicle body 3, and the driving braking torque correction quantity needed for alleviating at least one of the up-and-down movement physical quantities at these two points being determined and adopted in the vehicle body vibration suppressing control.

One may also adopt the following scheme: the vehicle body vibration x (up-and-down bounce speed dZv, pitch angular velocity dθp, up-and-down bounce quantity Zv and pitch angle θp) is converted to the relative up-and-down movement physical quantities of the left/right front wheels 1FL and 1FR and the left/right rear wheels 1RL and 1RR with respect to the vehicle body 3, with the driving braking force correction quantity needed for alleviating at least one of the up-and-down movement physical quantities of the front wheels and rear wheels being determined and adopted in the vehicle body vibration suppressing control.

The invention claimed is:

1. A vehicle body vibration estimating device for estimating a vehicle body vibration as a sprung mass of a vehicle where wheels are suspended via a suspension device, comprising:
at least one wheel speed sensor that detects a physical quantity related to wheel speed, which is a circumferential velocity of a wheel; and
a controller including a vibration estimating section that is programmed to estimate the vehicle body vibration by implementing a filtering treatment to extract only components near a vehicle body resonance a frequency from a correlation relationship, which is defined based on a geometric constraint condition that is determined by a link structure of the suspension device, between the displacements in a back-and-forth direction and displacements in an up-and-down direction of the wheels with respect to the vehicle body, and the physical quantity detected by the at least one wheel speed sensor.

2. The vehicle body vibration estimating device as recited in claim 1, wherein
the at least one shell speed sensor detects a front wheel physical quantity related to front wheel speeds which is a wheel speed of front wheels, and a rear wheel speed physical quantity related to rear wheel speeds, which is a wheel speed of rear wheels; and
the vibration estimating section estimates the vibration of the vehicle body based on the front wheel speed physical quantity and the correlation relationship between the displacements of the front wheels in the back-and-forth direction with respect to the vehicle body, as well as the rear wheel speed physical quantity and the correlation relationship between the displacements of the rear wheels in the back-and-forth direction.

3. The vehicle body vibration estimating device as recited in claim 1, wherein
the correlation relationship is a relationship between the displacements of the wheels in the back-and-forth direction and the displacements in the up-and-down direction with respect to the vehicle body which is converted to a prestored map.

4. The vehicle body vibration estimating device as recited in claim 1, wherein
the correlation relationship is a relationship between the displacements of the wheels in the back-and-forth direction and the displacements in the up-and-down direction with respect to the vehicle body which is converted to a prestored model.

5. The vehicle body vibration estimating device as recited in claim 1, wherein
the correlation relationship between the displacements of the wheels in the back-and-forth direction and the displacements in the up-and-down direction with respect to the vehicle body has a proportional coefficient for the linear approximation of the geometric constraints determined corresponding to the link structure of the suspension device.

6. The vehicle body vibration estimating device as recited claim 1, wherein
the correlation relationship between the displacements of the wheels in the back-and-forth direction and the displacements in the up-and-down direction is the one in which at least the correlation relationship for the front wheels is separate from the correlation relationship for the rear wheels.

7. The vehicle body vibration estimating device as recited claim 1, wherein
the estimated vibration of the vehicle body is the pitching vibration and/or the up-and-down vibration.

8. The vehicle body vibration estimating device as recited claim 2, wherein
the vibration estimating section has a front wheel up-and-down movement estimating section, which computes the displacements of the front wheels in the back-and-forth direction from the front wheel speed physical quantity, and estimates the displacements of the front wheels in the up-and-down direction from the correlation relationship between the displacements of the front wheels in the back-and-forth direction and the displacements in the up-and-down direction with respect to the vehicle body, and further comprising
a rear wheel up-and-down movement estimating section, which estimates the displacements of the rear wheels in the back-and-forth direction from the rear wheel speed physical quantity, and estimates the displacements of the rear wheels in the up-and-down direction from the correlation relationship between the displacements of the rear wheels in the back-and-forth direction and the displacements in the up-and-down direction with respect to the vehicle body, with the vibration of the vehicle body being estimated from the estimated displacements of the front wheels in the up-and-down direction and the displacements of the rear wheels in the up-and-down direction.

9. The vehicle body vibration estimating device as recited claim 2, wherein
the vibration estimating section solves simultaneous equations including the first movement equation for computing the displacements of the front wheels in the up-and-down direction from the front wheel speed physical quantity, the second movement equation for computing the displacements of the rear wheels in the up-and-down direction from the rear wheel physical quantity, the third movement equation for computing the pitching movement of the vehicle body from the displacements of the front wheels in the up-and-down direction and the displacements of the rear wheels in the up-and-down direction, and the fourth movement equation for computing the up-and-down movement of the vehicle body from the displacements of the front wheels in the up-and-down direction and the displacements of the rear wheels in the up-and-down direction, to determine the pitching movement and up-and-down movement of the vehicle body, so as to estimate the vibration of the vehicle body.

10. The vehicle body vibration estimating device as recited claim 1, wherein
the vibration estimating section uses the wheel speed physical quantity vibration component in company with the back-and-forth vibration of the vehicle body among the wheel speed physical quantities in estimating the vehicle body vibration.

11. The vehicle body vibration estimating device as recited in claim 1, wherein the vibration estimating section uses the offset between the wheel speed physical quantity and the vehicle speed as the wheel speed physical quantity vibration component in estimating the vehicle body vibration.

12. The vehicle body vibration estimating device as recited in claim 10, wherein
the vibration estimating section, by extracting only the component near a vehicle body resonance frequency from the wheel speed physical quantity, uses a signal after the filtering treatment as the wheel speed physical quantity vibration component in estimating the vehicle body vibration.

13. The vehicle body vibration estimating device as recited in claim 10, wherein
the vibration estimating section takes a signal after the filtering treatment for removing the low frequency component from the wheel speed physical quantity as the wheel speed physical quantity vibration component in estimating the vehicle body vibration.

14. The vehicle body vibration estimating device as recited in claim 13, wherein
the frequency component obtained by removing the wheel speed physical quantity in the filtering treatment is the frequency component near the resonance frequency of the vehicle body, or the prescribed low frequency component lower than the frequency near the resonance frequency of the vehicle body.

15. The vehicle body vibration estimating device as recited claim 1, wherein
the vibration estimating section carries out the filtering treatment to remove the drift component from the estimated vehicle body vibration to obtain the final vehicle body vibration estimated value.

16. The vehicle body vibration estimating device as recited claim 1, wherein
the vibration estimating section carries out the filtering treatment for extracting only near the resonance frequency of the vehicle body with respect to the estimated vehicle body vibration, and determines the final vehicle body vibration estimated value.

17. The vehicle body vibration estimating device as recited claim 1, wherein
the vibration estimating section carries out the filtering treatment for removing a low frequency component with respect to the estimated vehicle body vibration to obtain the final vehicle body vibration estimated value.

18. The vehicle body vibration estimating device as recited in claim 17, wherein
the low frequency component removed in the filtering treatment is the frequency component near the resonance frequency of the vehicle body, or a prescribed low frequency component lower than the frequency near the resonance frequency of the vehicle body.

19. The vehicle body vibration estimating device as recited claim 1, wherein
the vibration estimating section estimates the pitch angular velocity of the vehicle body pitching movement to be the vehicle body vibration.

20. The vehicle body vibration estimating device as recited claim 1, wherein
the vibration estimating section estimates the up-and-down speed of the up-and-down movement of the vehicle body as the vehicle body vibration.

21. The vehicle body vibration estimating device as recited claim 1, wherein
the vibration estimating section has a differentiator that differentiates the wheel speed physical quantity and converts it to the wheel acceleration information, and, by using the wheel acceleration information from the differentiator in estimating the vehicle body vibration, the pitching angular acceleration of the vehicle body pitching movement is estimated as the vehicle body vibration.

22. The vehicle body vibration estimating device as recited claim 1, wherein
the vibration estimating section has a differentiator that differentiates the wheel speed physical quantity and converts it to the wheel acceleration information, and, as the wheel acceleration information from the differentiator is used in estimating the vehicle body vibration, the up-and-down acceleration of the up-and-down movement of the vehicle body is estimated as the vehicle body vibration.

23. The vehicle body vibration estimating device as recited claim 1, wherein
the vibration estimating section corrects the wheel speed corresponding to the variation in the pitching angle of the vehicle body to estimate the vehicle body vibration.

24. The vehicle body vibration estimating device as recited in claim 23, wherein
correction of the wheel speed physical quantity is carried out by subtracting the vehicle body pitch angular velocity from the wheel speed physical quantity.

25. The vehicle body vibration estimating device as recited claim 1, wherein
the at least one wheel speed sensor further comprises additional wheel sensors that individually detects the wheel speed physical quantities of the left/right four wheels; and
the vibration estimating section estimates the vehicle body vibration from the correlation relationship between the displacements in the back-and-forth direction and the displacements in the up-and-down direction of the four wheels and from various wheel speed physical quantities of the four wheels.

26. The vehicle body vibration estimating device as recited claim 1, further comprising
a driving braking force sensor that detects the driving braking force of the vehicle;
a requested torque computing section programmed to receive a signal from the driving braking force sensor;
a wheel speed physical quantity standard vehicle body vibration estimating section programmed to receive a signal from the vibration estimating section to estimate a wheel speed physical quantity standard; and
the controller further comprises a driving braking force standard vehicle body vibration estimating section that works as follows: while the vehicle body vibration of the wheel speed physical quantity standard is taken as the observer input, the vehicle model is adopted to estimate the vibration of the vehicle body from the driving braking force of the vehicle determined using the driving braking force detecting section, and the estimated vehicle body vibration is taken as the final vehicle body vibration.

27. The vehicle body vibration estimating device as recited in claim 26, wherein
the requested torque computing section computes a request torque of the vehicle from the driving operation, and the request torque is taken as the driving braking force of the vehicle in estimation by the driving braking force standard vehicle body vibration estimating section.

28. The vehicle body vibration estimating device as recited in claim 26, further comprising an actuator that automatically adjusts the driving braking force of the vehicle, the driving braking force detecting section computes the request torque of the vehicle from the manipulation of the actuator, and the request torque is then adopted as the driving braking force of the vehicle in estimation by the driving braking force standard vehicle body vibration estimating section.

29. The vehicle body vibration estimating device as recited claim 26, wherein
the driving braking force standard vehicle body vibration estimating section takes the pitching vibration and/or the up-and-down vibration estimated by the wheel speed physical quantity standard vehicle body vibration estimating section as an observer input in estimating the pitching vibration and/or the up-and-down vibration as the driving braking force standard vehicle body vibration, which is the final vehicle body vibration.

30. A vehicle body vibration suppressing control computing unit including the vehicle body vibration estimating device as recited claim 1, wherein
the controller further comprises:
a driving braking force correction quantity computing section that computes the driving braking force correction quantity needed for alleviating the vehicle body vibration estimated by the vibration estimating section or the driving braking force standard vehicle body vibration estimating section; and
a driving braking force correcting section that corrects the driving braking force of the vehicle only by the driving braking force correction quantity determined by the driving braking force correction quantity computing section.

31. The vehicle body vibration suppressing control computing unit as recited in claim 30, wherein
the driving braking force correction quantity computing section has a prescribed gain multiplied to the final vehicle body vibration to determine the driving braking force correction quantity.

32. The vehicle body vibration suppressing control computing unit as recited in claim 31, wherein
the driving braking force correction quantity computing section takes the linear sum of the products obtained by multiplying the prescribed gain to the final vehicle body vibration estimated by the driving braking force standard vehicle body vibration estimating section as the driving braking force correction quantity.

33. The vehicle body vibration suppressing control computing unit as recited in claim 32, wherein
the prescribed gain is the regulator gain for weighting the degree of suppression for each type of the final vehicle body vibration estimated by the driving braking force standard vehicle body vibration estimating section.

34. The vehicle body vibration suppressing control computing unit as recited in claim 32, wherein
the prescribed gain comprises multiple regulator gains set for various weighting patterns of the suppression degree with respect to the final vehicle body vibration estimated by the driving braking force standard vehicle body vibration estimating section; and the driving braking force correction quantity computing section takes the sum of the products of the multiple regulator gains and the final vehicle body vibration as the driving braking force correction quantity.

35. The vehicle body vibration suppressing control computing unit as recited in claim 32, wherein
the prescribed gain comprises multiple regulator gains set for changing various weighting patterns of the suppression degree with respect to the final vehicle body vibration estimated by the driving braking force standard vehicle body vibration estimating section; and
the driving braking force correction quantity computing section takes the sum of the products of the multiple regulator gains, the tuning gains with respect to these regulator gains, and the final vehicle body vibration as the driving braking force correction quantity.

36. The vehicle body vibration suppressing control computing unit as recited claim 18, wherein
the final vehicle body vibration refers to the pitching vibration and/or the up-and-down vibration.

37. The vehicle body vibration estimating device as recited claim 1, further comprising
at least one vehicle body vibration physical quantity sensor that detects the vehicle body vibration, the vibration estimating section being a vehicle body vibration state quantity computing section for computing a first vehicle body vibration state quantity; and
the controller further comprises a vehicle body vibration state quantity complementing section that determines a second vehicle body vibration state quantity from the first vehicle body vibration state quantity, the first vehicle body vibration state quantity and the second vehicle body vibration state quantity are output as the vehicle body vibration estimation result.

38. The vehicle body vibration estimating device as recited in claim 37, wherein
the vehicle body vibration state quantity complementing section takes at least one of the differential value and an integration value of the first vehicle body vibration state quantity as the second vehicle body vibration state quantity.

39. The vehicle body vibration estimating device as recited in claim 38, wherein
the vehicle body vibration state quantity complementing section has a differentiator, which takes a differential value of the vehicle body vibration state quantity as the second vehicle body vibration state quantity.

40. The vehicle body vibration estimating device as recited in claim 38, wherein
the vehicle body vibration state quantity complementing section has an integrator, which takes the integration value of the vehicle body vibration state quantity as the second vehicle body vibration state quantity.

41. The vehicle body vibration estimating device as recited in claim 40, wherein
the integrator is a pseudo integrator having a prescribed time constant, and the component due to the old input corresponding to the prescribed time constant is gradually deleted from the integration results.

42. The vehicle body vibration estimating device as recited in claim 41, wherein
the pseudo integrator sets the prescribed time constant equal to or higher than the vehicle body resonance period, and allows accumulation of the information of the resonance period portion.

43. The vehicle body vibration estimating device as recited claim 42, wherein
as the vehicle body vibration physical quantities, the at least one vehicle body vibration physical quantity sensor detects the front wheel speed and physical quantities related to the front wheel and the rear wheel speed and physical quantities related to the rear wheel; and
the vehicle body vibration quantity computing section computes the second vehicle body vibration state quantity based on the front wheel speed and the rear wheel speed, the correlation relationship between the displacements of the front wheels in the back-and-forth direction and the displacements in the up-and-down direction with respect to the vehicle body, and the correlation relationship between the displacements of the rear wheels in the back-and-forth direction and the displacements in the up-and-down direction with respect to the vehicle body.

44. The vehicle body vibration estimating device as recited in claim 43, wherein the correlation relationship between the displacements in the back-and-forth direction and the displacements in the up-and-down direction of the front wheels and the rear wheels is the geometric constraints corresponding to the link structure of the suspension device.

45. The vehicle body vibration estimating device as recited claim 37, wherein the vehicle body vibration state quantity complementing section carries out the filtering treatment to remove the steady component or the low frequency component with respect to the second vehicle body vibration state quantity as its own computing result, or the first vehicle body vibration state quantity from the vehicle body vibration state quantity computing section, or both the vehicle body vibration state quantity and the first vehicle body vibration state quantity.

46. The vehicle body vibration estimating device as recited claim 37, wherein the vehicle body vibration state quantity complementing section carries out the filtering treatment for removing the high frequency component for the second vehicle body state quantity as its own computing result or the first vehicle body vibration state quantity from the vehicle body vibration state quantity computing section, or both the second vehicle body vibration state and the first vehicle body vibration state quantity.

47. The vehicle body vibration estimating device as recited claim 37, wherein a vehicle body vibration state sensor that directly or indirectly detects the vehicle body vibration state quantity is provided; and the vehicle body vibration state quantity detected by the vehicle body vibration state sensor is taken as the first vehicle body vibration state quantity.

48. The vehicle body vibration estimating device as recited claim 37, wherein the first vehicle body vibration state quantity computed by the vehicle body vibration state quantity computing section refers to the pitch angular velocity and the up-and-down bounce speed; and the second vehicle body vibration state quantity determined by the vehicle body vibration state quantity complementing section is at least one of the pitching angle and the pitch angular velocity, and at least one of the up-and-down bounce quantity and the up-and-down bounce acceleration.

49. A vehicle body vibration control computing unit including the vehicle body vibration estimating device as recited claim 37, wherein the controller further comprises a vehicle body vibration suppressing controller;

a driving braking force correction quantity computing section that computes the driving braking force needed for alleviating the first vehicle body vibration state quantity computed by the vehicle body vibration state quantity computing section and the second vehicle body vibration state quantity determined by the vehicle body vibration state quantity complementing section; and a driving braking force correcting section that corrects the driving braking force of the vehicle by the driving braking force correction quantity determined by the driving braking force correction quantity computing section.

50. The vehicle body vibration suppressing control computing unit as recited in claim 49, wherein the driving braking force correction quantity computing section multiplies the first vehicle body vibration state quantity by a prescribed gain and the second vehicle body vibration state quantity to determine the driving braking force correction quantity.

51. The vehicle body vibration suppressing control computing unit as recited in claim 50, wherein the driving braking force correction quantity computing section takes the linear sum of the products obtained by multiplying the prescribed gain to the first vehicle body vibration state quantity and the second vehicle body vibration state quantity as the driving braking force correction quantity.

52. The vehicle body vibration suppressing control computing unit as recited in claim 51, wherein the prescribed gain is the regulator gain set as for weighting the suppression degree for each type of the first vehicle body vibration state quantity and the second vehicle body vibration state quantity.

53. The vehicle body vibration suppressing control computing unit as recited in claim 52, wherein the prescribed gain comprises multiple regulator gains set for changing weighting patterns of the suppression degree with respect to the first vehicle body vibration state quantity and the second vehicle body vibration state quantity; and the driving braking force correction quantity computing section takes the sum of the products of the multiple regulator gains and the first vehicle body vibration state quantity and the second vehicle body vibration state quantity as the driving braking force correction quantity.

54. The vehicle body vibration suppressing control computing unit as recited in claim 51, wherein the prescribed gain comprises multiple regulator gains set for changing weighting patterns of the suppression degree with respect to the first vehicle body vibration state quantity and the second vehicle body vibration state quantity; and the driving braking force correction quantity computing section takes the sum of the products of the multiple regulator gains, the tuning gains with respect to these regulator gains, and the first vehicle body vibration state quantity and the second vehicle body vibration state quantity as the driving braking force correction quantity.

55. The vehicle body vibration suppressing control computing unit as recited in claim 49, wherein the driving braking force correction quantity computing section has the first vehicle body vibration state quantity and the second vehicle body vibration state quantity converted to the up-and-down movement physical quantities at any two points on the vehicle body, determines the driving braking force correction quantity needed for alleviating at least one of the vehicle body up-and-down movement physical quantities at these two points, and provides it for the driving braking force correction by the driving braking force correcting section.

56. The vehicle body vibration suppressing control computing unit as recited in claim 49, wherein the driving braking force correction quantity computing section works as follows: the first vehicle body vibration state quantity and the second vehicle body vibration state quantity are converted to the relative up-and-down movement physical quantities of the front wheels and rear wheels with respect to the vehicle body; the driving braking force correction quantity needed for alleviating at least one of the up-and-down movement physical quantities of the front wheels and rear wheels is determined and sent for the driving braking force correction by the driving braking force correcting section.

* * * * *